(12) United States Patent
Mengle et al.

(10) Patent No.: US 9,378,276 B1
(45) Date of Patent: Jun. 28, 2016

(54) SYSTEMS AND METHODS FOR GENERATING NAVIGATION FILTERS

(71) Applicant: Google Inc., Mountain View, CA (US)

(72) Inventors: Advay Mengle, Mountain View, CA (US); Gaurav Garg, Mountain View, CA (US); Shreyas Doshi, Mountain View, CA (US); Venky Ramachandran, Mountain View, CA (US); Xin Zheng, Mountain View, CA (US); Ramakrishnan Kandhan, Mountain View, CA (US); Poorva Hari Potdar, Mountain View, CA (US)

(73) Assignee: Google Inc., Mountain View, CA (US)

( * ) Notice: Subject to any disclaimer, the term of this patent is extended or adjusted under 35 U.S.C. 154(b) by 386 days.

(21) Appl. No.: 14/146,769

(22) Filed: Jan. 3, 2014

(51) Int. Cl.
*G06F 17/30* (2006.01)

(52) U.S. Cl.
CPC .... *G06F 17/30699* (2013.01); *G06F 17/30864* (2013.01)

(58) Field of Classification Search
USPC .................................. 707/722, 723, 748, 754
See application file for complete search history.

(56) References Cited

U.S. PATENT DOCUMENTS

| | | | |
|---|---|---|---|
| 6,269,362 B1 * | 7/2001 | Broder | G06F 17/30864 |
| 6,389,409 B1 * | 5/2002 | Horovitz | G06F 17/30864 |
| 2002/0156688 A1 * | 10/2002 | Horn | G06Q 10/087 |
| | | | 705/14.51 |
| 2003/0167265 A1 * | 9/2003 | Corynen | G06Q 10/04 |
| 2004/0143600 A1 * | 7/2004 | Musgrove | G06F 17/30864 |
| 2005/0091576 A1 * | 4/2005 | Relyea | G06F 9/4443 |
| | | | 715/211 |
| 2005/0091672 A1 * | 4/2005 | Debique | G06F 8/20 |
| | | | 719/328 |
| 2008/0104032 A1 * | 5/2008 | Sarkar | G06F 17/3089 |
| 2008/0307222 A1 * | 12/2008 | Chow | H04L 63/0823 |
| | | | 713/156 |
| 2009/0012984 A1 * | 1/2009 | Ravid | G06F 17/30705 |
| 2010/0083124 A1 * | 4/2010 | Druzgalski | G06F 17/3087 |
| | | | 715/738 |

* cited by examiner

*Primary Examiner* — Cam-Linh Nguyen
(74) *Attorney, Agent, or Firm* — Foley & Lardner LLP; John D. Lanza; James De Vellis

(57) ABSTRACT

Systems and methods for generating navigation filters are provided. A target resource is parsed and occurrences of data entries representing archetypal headings and/or archetypal items for a navigation filter are identified in the content of the target resource. A path to each of the identified occurrences is determined and used to construct a query for additional navigation filter headings and/or navigation filter items that have the same path as an identified occurrence. Identified occurrences of archetypal data entries in the target resource and the additional content having the same path as an identified occurrence are used as potential navigation filter headings and/or potential navigation filter items. Navigation filters are generated by associating one or more of the potential navigation filter items with one of the potential navigation filter headings.

26 Claims, 5 Drawing Sheets

SYSTEMS AND METHODS FOR GENERATING NAVIGATION FILTERS

CROSS-REFERENCE TO RELATED PATENT APPLICATIONS

This application is related to U.S. patent application Ser. No. 13/943,608 titled "Systems and Methods for Providing Navigation Filters" filed Jul. 16, 2013, the entirety of which is incorporated by reference herein.

BACKGROUND

The Internet provides access to a wide variety of electronic content. Typically, content providers (e.g., advertisers) create third-party content items (e.g., advertisements) which can be presented to a user device via a content slot of an electronic resource. Such third-party content items often direct a web browser operating on the user device to a target resource (e.g., a landing page or website operated by the content provider) when clicked by a user. The target resource can list or link to hundreds of different products, services, or other items. Frequently, the third-party content items include a textual portion (e.g., an ad creative) designed to capture the attention of a consumer. However, these textual portions often do a poor job of summarizing the content of the target resource.

SUMMARY

One implementation of the present disclosure is a method for generating navigation filters. The method includes receiving, at a processing circuit, a set of data entries representing at least one of archetypal headings or archetypal items for a navigation filter. The data entries may include raw textual data. The method further includes normalizing the data entries to convert the raw textual data into a standard form. The normalized data entries include at least one of potential navigation filter headings or potential navigation filter items. The method further includes identifying occurrences of the normalized data entries in an electronic resource, determining a path to each of the identified occurrences of a normalized data entry in the electronic resource, and using the path to an identified occurrence to construct a query for at least one of potential navigation filter headings or potential navigation filter items that have the same path as the identified occurrence in the electronic resource. The method further includes generating a navigation filter by associating one or more of the potential navigation filter items with one of the potential navigation filter headings.

In some implementations, the set of data entries includes a plurality of conceptually parallel items associated with a specific heading type, wherein the set of data entries vary along a dimension defined by the heading type.

In some implementations, normalizing the data entries includes at least one of removing extraneous punctuation or numbers, trimming whitespace, standardizing casing, or adjusting plurality.

In some implementations, identifying occurrences of the normalized data entries in the electronic resource includes identifying one or more hyperlinks or other tags in the electronic resource (e.g., list item tags <li>, paragraph tags <p>, etc.), parsing content text associated with each of the identified hyperlinks to determine whether the content text matches a normalized data entry, and marking an identified hyperlink of the electronic resource with a navigation filter item annotation in response to a determination that the content text associated with the identified hyperlink matches one or more of the normalized data entries.

In some implementations, identifying occurrences of the normalized data entries in the electronic resource includes identifying one or more tags in the electronic resource, parsing content text associated with each of the identified tags to determine whether the content text matches a normalized data entry, and marking an identified tag of the electronic resource with a navigation filter heading annotation in response to a determination that the content text associated with the identified tag matches one or more of the normalized data entries.

In some implementations, the method further includes, for each of the identified tags, determining whether the tag is a leaf node of the electronic resource, determining whether the tag is a child node of a hyperlink, and removing the tag from consideration as a potential navigation filter heading in response to a determination that the tag is not a leaf node or in response to a determination that the tag is a child node of a hyperlink.

In some implementations, determining the path to each of the identified occurrences of a normalized data entry in the electronic resource includes selecting a root element of the electronic resource, identifying one or more intermediate tags of the electronic resource between the root element and the normalized data entry for each identified occurrence of a normalized data entry in the electronic resource, and determining a path from the root element to the normalized data entry through the one or more intermediate tags for each identified occurrence of a normalized data entry in the electronic resource.

In some implementations, associating one or more of the potential navigation filter items with one of the potential navigation filter headings includes determining a sequence in which the potential navigation filter headings and the potential navigation filter items are arranged in the electronic resource, identifying one or more of the potential navigation filter items that are arranged between a first heading and a second heading in the sequence, and associating with the first heading one or more of the potential navigation filter items that are arranged between the first heading and the second heading.

In some implementations, associating one or more of the potential navigation filter items with one of the potential navigation filter headings includes determining a path to a first potential navigation filter item immediately following a potential navigation filter heading in the electronic resource and associating a second potential navigation filter item with the potential navigation filter heading in response to a determination that the second potential navigation filter item has the same path as a first potential navigation filter item. In some implementations, one or more additional potential navigation filter items (e.g., a third item, a fourth item, etc.) are also associated with the potential navigation filter heading in response to a determination that the additional potential navigation filter items have the same path as the first potential navigation filter item.

In some implementations, associating one or more of the potential navigation filter items with one of the potential navigation filter headings includes using a document object model representation of the electronic resource to determine a most recent common ancestor of a potential navigation filter heading and a first potential navigation filter item immediately following the potential navigation filter heading and associating a second potential navigation filter item with the potential navigation filter heading in response to a determination that the second potential navigation filter item and the potential navigation filter heading have the same most recent common ancestor as the first potential navigation filter item and the potential navigation filter heading.

In some implementations, the method further includes determining, for each item of the generated navigation filter, whether the item matches one or more of the normalized data entries and discarding the generated navigation filter in response to a determination that the generated navigation filter includes less than a threshold number of items that match one or more of the normalized data entries.

In some implementations, the method further includes generating a set of multiple navigation filters for a grouping of electronic resources; determining, for each of the multiple navigation filters, a number of repeat instances of the navigation filter in the set of multiple navigation filters; and discarding a generated navigation filter in response to a determination that the number of repeat instances of the generated navigation filter exceeds a threshold value.

In some implementations, the method further includes identifying a defined heading type, determining a dominant interpretation for each of the archetypal items, and filtering the set of data entries to remove an archetypal item in response to a determination that the dominant interpretation of the archetypal item does not match the defined heading type.

Another implementation of the present disclosure is a system for generating navigation filters. The system includes a processing system configured to receive a set of data entries representing at least one of archetypal headings or archetypal items for a navigation filter. The data entries may include raw textual data. The processing system is further configured to normalize the data entries to convert the raw textual data into a standard form. The normalized data entries may include at least one of potential navigation filter headings or potential navigation filter items. The processing system is further configured to identify occurrences of the normalized data entries in an electronic resource, determine a path to each of the identified occurrences of a normalized data entry in the electronic resource, and use the path to an identified occurrence to construct a query for at least one of potential navigation filter headings or potential navigation filter items that have the same path as the identified occurrence in the electronic resource. The processing system is further configured to generate a navigation filter by associating one or more of the potential navigation filter items with one of the potential navigation filter headings.

In some implementations, normalizing the data entries includes at least one of removing extraneous punctuation or numbers, trimming whitespace, standardizing casing, or adjusting plurality.

In some implementations, identifying occurrences of the normalized data entries in the electronic resource includes identifying one or more hyperlinks or other tags in the electronic resource (e.g., list item tags <li>, paragraph tags <p>, etc.), parsing content text associated with each of the identified hyperlinks to determine whether the content text matches a normalized data entry, and marking an identified hyperlink of the electronic resource with a navigation filter item annotation in response to a determination that the content text associated with the identified hyperlink matches one or more of the normalized data entries.

In some implementations, identifying occurrences of the normalized data entries in the electronic resource includes identifying one or more tags in the electronic resource, parsing content text associated with each of the identified tags to determine whether the content text matches a normalized data entry, and marking an identified tag of the electronic resource with a navigation filter heading annotation in response to a determination that the content text associated with the identified tag matches one or more of the normalized data entries.

In some implementations, the processing system is configured to, for each of the identified tags, determine whether the tag is a leaf node of the electronic resource, determine whether the tag is a child node of a hyperlink, and remove the tag from consideration as a potential navigation filter heading in response to a determination that the tag is not a leaf node or in response to a determination that the tag is a child node of a hyperlink.

In some implementations, determining the path to each of the identified occurrences of a normalized data entry in the electronic resource includes selecting a root element of the electronic resource, identifying one or more intermediate tags of the electronic resource between the root element and the normalized data entry for each identified occurrence of a normalized data entry in the electronic resource, and determining a path from the root element to the normalized data entry through the one or more intermediate tags for each identified occurrence of a normalized data entry in the electronic resource.

In some implementations, associating one or more of the potential navigation filter items with one of the potential navigation filter headings includes determining a sequence in which the potential navigation filter headings and the potential navigation filter items are arranged in the electronic resource, identifying one or more of the potential navigation filter items that are arranged between a first heading and a second heading in the sequence, and associating with the first heading one or more of the potential navigation filter items that are arranged between the first heading and the second heading.

In some implementations, associating one or more of the potential navigation filter items with one of the potential navigation filter headings includes determining a path to a first potential navigation filter item immediately following a potential navigation filter heading in the electronic resource and associating a second potential navigation filter item with the potential navigation filter heading in response to a determination that the second potential navigation filter item has the same path as a first potential navigation filter item.

In some implementations, associating one or more of the potential navigation filter items with one of the potential navigation filter headings includes using a document object model representation of the electronic resource to determine a most recent common ancestor of a potential navigation filter heading and a first potential navigation filter item immediately following the potential navigation filter heading and associating a second potential navigation filter item with the potential navigation filter heading in response to a determination that the second potential navigation filter item and the potential navigation filter heading have the same most recent common ancestor as the first potential navigation filter item and the potential navigation filter heading.

In some implementations, the processing system is configured to determine, for each item of the generated navigation filter, whether the item matches one or more of the normalized data entries and to discard the generated navigation filter in response to a determination that the generated navigation filter includes less than a threshold number of items that match one or more of the normalized data entries.

In some implementations, the processing system is configured to generate a set of multiple navigation filters for a grouping of electronic resources; determine, for each of the multiple navigation filters, a number of repeat instances of the navigation filter in the set of multiple navigation filters; and discard a generated navigation filter in response to a determination that the number of repeat instances of the generated navigation filter exceeds a threshold value.

In some implementations, the processing system is configured to identify a defined heading type, determine a dominant interpretation for each of the archetypal items, and filter the set of data entries to remove an archetypal item in response to a determination that the dominant interpretation of the archetypal item does not match the defined heading type.

Another implementation of the present disclosure is a system for extracting navigation filter content from a target resource. The system includes a processing system configured to identify occurrences of textual data entries in the target resource, determine a path to each of the identified occurrences of a normalized data entry in the target resource, and use the path to an identified occurrence to construct a query for at least one of potential navigation filter headings or potential navigation filter items that have the same path as the identified occurrence in the target resource.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
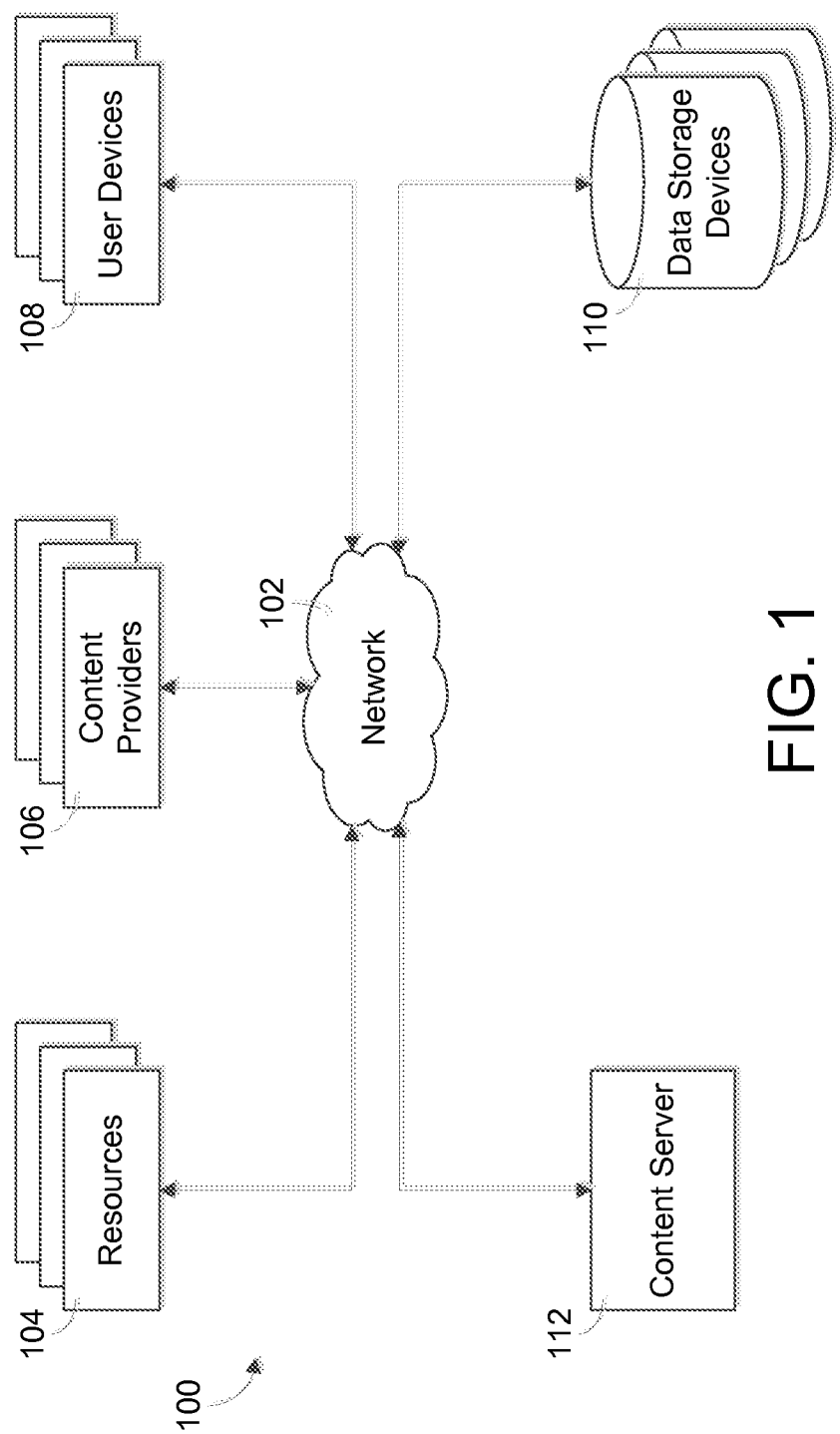
FIG. 1 is a block diagram of a computer system including a network, resources, content providers, user devices, and a content server, according to a described implementation.

Referring generally to the FIGURES, systems and methods for generating navigation filters are shown. In a computerized content delivery network, electronic content items (e.g., advertisements) are distributed from a content server to a plurality of user devices. Content items typically include embedded hyperlinks which cause user devices to navigate to a target resource (e.g., a landing page) upon an interaction with the content items (e.g., clicking a content item).

A navigation filter may be a single heading associated with a plurality of conceptually parallel items. Navigation filters may be integrated with a content item which directs to the target resource and used to summarize the content of the target resource. A typical resource may list or link to hundreds of different products, services, resources, or other items. Navigation filters may provide a summary of the target resource within the content display area of the content item, thereby allowing a user to preview the content available on the target resource prior to clicking the content item. For example, navigation filters may summarize, organize, and/or present relevant information or links from the target resource as a conceptually parallel list within the content item.

In some implementations, the plurality of items associated with a navigation filter heading may be variations along a single dimension. For example, if a user device submits a search query for "DSLR Cameras," the user device may be delivered (e.g., by the content server) a content item which directs to a target resource through which such cameras can be purchased. The target resource could include potentially hundreds of different cameras, and may have categories or attributes which a user can use to further refine the search. One dimension related to a camera is the maximum resolution of the camera. An example navigation filter may have the heading "Megapixels" and a list of items describing variation along the "Megapixels" dimension (e.g., "Less than 5," "5 to 9," "10 and up," etc.). The navigation filters may be presented in a variety of formats including informational lists, hyperlinks to specific portions and/or pages of the target resource, and/or drop-down lists from which a user can select a desired item.

The systems and methods described herein may be used to generate navigation filters for a particular target resource. In some implementations, predefined lists of archetypal navigation filter content (e.g., archetypal navigation filter headings and/or archetypal navigation filter items) may be used to identify and extract additional navigation filter content from the target resource. For example, a predefined list may include archetypal textual data entries for a specific heading type (e.g., entity names, brand names, colors, price ranges, geographic locations, etc.). The textual data entries may be normalized to convert the raw textual data into a standard form (e.g., removing extraneous punctuation or numbers, standardizing casing, adjusting plurality, removing modifiers, etc.). The content of the target resource may be parsed to identify occurrences of the normalized data entries therein.

The systems and methods of the present disclosure may determine a path (e.g., an XPath, an XPath variant, etc.) to each identified occurrence of a normalized data entry in the target resource. The path may be determined by traversing annotations (e.g., HTML tags) within a document using a textual query. The paths to the identified occurrences may be used to construct an XPath-like query for additional navigation filter content. For example, the systems and methods described herein may identify and extract additional potential navigation filter headings and/or items that have the same path as a normalized data entry. Navigation filters may be assembled by associating one or more of the potential navigation filter items with one of the potential navigation filter headings.

In some implementations, the navigation filters may be automatically ranked or filtered to determine which of the potentially applicable navigation filters to integrate with a content item. In some implementations, the ranking may be based on the keywords of a search query which led to the selection of a particular content item (e.g., by a content server) or information associated with the user device from which the request for content is received (e.g., interest categories, behavioral information, etc.). In other implementations, the ranking or filtering may be based on the layout or structure of the target resource. For example, a particular heading or item which is displayed prominently or repeatedly on the target resource may be ranked higher than other items or headings in the list of potentially applicable navigation filters. In some implementations the ranking and filtering may be specified by a content provider rather than via an automated ranking process.

Referring now to FIG. 1, a block diagram of a computer system 100 is shown, according to a described implementation. Computer system 100 is shown to include a network 102, resources 104, content providers 106, user devices 108, data storage devices 110, and content server 112. Computer system 100 may facilitate communication between content providers 106, user devices 108, and content server 112. For example, content providers 106 may provide various content items to content server 112 via network 102. Content server 112 may select content items for delivery to user devices 108 based on a request for content received from user devices 108. Content server may deliver the selected content items to user devices 108 via network 102.

Computer system 100 may also facilitate communication between resources 104, content providers 106, and content server 112. For example, content server 112 may receive a URL of a target resource from content providers 106. The URL may be included as part of a content item provided by content providers 106 or received from content providers 106 via a management interface (e.g., an interface used to manage the distribution and attributes of various content items). The URL may specify the location of a landing page located at resources 104. Content server 112 may retrieve resource content from resources 104 and use the resource content to generate a set of navigation filters potentially applicable to a content item. The navigation filters may be ranked, filtered, integrated with the content item, and distributed along with the content item to user devices 108.

Still referring to FIG. 1, computer system 100 is shown to include a network 102. Network 102 may be a local area network (LAN), a wide area network (WAN), a cellular network, a satellite network, a radio network, the Internet, or any other type of data network or combination thereof. Network 102 may include any number of computing devices (e.g., computers, servers, routers, network switches, etc.) configured to transmit, receive, or relay data. Network 102 may further include any number of hardwired and/or wireless connections. For example, user devices 108 may communicate wirelessly (e.g., via WiFi, cellular, radio, etc.) with a transceiver that is hardwired (e.g., via a fiber optic cable, a CAT5 cable, etc.) to a computing device of network 102.

Still referring to FIG. 1, computer system 100 is shown to include resources 104. Resources 104 may include any type of information or data structure that can be provided over network 102. In some implementations, resources 104 may be identified by a resource address associated with each resource (e.g., a resource URL) Resources 104 may include web pages (e.g., HTML web pages, PHP web pages, etc.), word processing documents, portable document format (PDF) documents, images, video, programming elements, interactive content, streaming video/audio sources, or other types of electronic information. Resources 104 may include content having embedded information (e.g., meta-information embedded in hyperlinks) and/or embedded instructions. Embedded instructions may include computer-readable instructions (e.g., software code, JavaScript®, ECMAScript®, etc.) which are executed by user devices 108 (e.g., by a web browser running on user devices 108) upon viewing resource content.

Resources 104 may include content slots for presenting third-party content items. For example, resources 104 may include one or more inline frame elements (e.g., HTML "iframe" elements, <iframe> . . . </iframe>) for presenting content items from content providers 106. An inline frame can be the "target" frame for links defined by other elements and can be selected by user agents (e.g., user devices 108, a web browser running on user devices 108, etc.) as the focus for printing, viewing its source, or other forms of user interaction. The content slots may cause user devices 108 to request third-party content items from content server 112 in response to viewing first-party resource content from resources 104.

Resources 104 may include landing pages for various content items. For example, content items received from content providers 106 may have a hyperlink URL (e.g., given by a href attribute) which specifies a location of resources 104. User devices 108 may be directed to resources 104 upon clicking or otherwise interacting with a distributed content item. A target resource may include one or more individual web pages located at resources 104. For example, a target resource may be defined by a domain name having a plurality of web pages. A target resource may include links to other portions of the target resource (e.g., having the same domain) or to other resources. In some implementations, a target resource may be a website associated with (e.g., operated by, controlled by, owned by, etc.) a particular content provider. In some implementations, target resources may provide additional information relating to a product, service, or business featured in a distributed content item. For example, resources 104 may include a website through which a product or service featured in the content item can be purchased.

In some implementations, resources 104 may be combined with content providers 106. For example, resources 104 may include data stored on the one or more electronic devices (e.g., computers, servers, etc.) which define content providers 106. In other implementations, resources 104 may be separate from content providers 106. For example, resources 104 may include data stored on a remote server (e.g., FTP servers, file sharing servers, web servers, etc.), combinations of servers (e.g., data centers, cloud computing platforms, etc.), or other data storage devices separate from the devices which define content providers 106.

Still referring to FIG. 1, computer system 100 is shown to include content providers 106. Content providers 106 may include one or more electronic devices representing advertisers, resource operators, business owners, or other entities using the services provided by content server 112. In some implementations, content providers 106 may produce content items (e.g., an ad creative) for presentation to user devices 108. In other implementations, content providers 106 may submit a content generation request to content server 112 and content server 112 may automatically generate a content item in response to the request. The content items may be stored in one or more data storage devices local to content providers 106, within content server 112, or in data storage devices 110.

In some implementations, the content items may be advertisements. The advertisements may be display advertisements such as image advertisements, animated advertisements, video advertisements, text-based advertisements, or any combination thereof. In other implementations, the content items may include other types of content which serve various non-advertising purposes. The content items may be displayed in a content slot of resources 104 and presented to user devices 108 (e.g., alongside resource content from resources 104).

In some implementations, content providers 106 may submit campaign parameters to content server 112. The campaign parameters may be used to control the distribution of content items to user devices 108. The campaign parameters may include keywords associated with the content items, bids corresponding to the keywords, a content distribution budget, geographic limiters, or other criteria used by content server 112 to determine when a content item may be presented to user devices 108.

Content providers 106 may access content server 112 to monitor the performance of the content items distributed according to the established campaign parameters. For example, content providers 106 may access content server 112 to review one or more performance metrics associated with a content item or set of content items. The performance metrics may describe the interactions between user devices 108 with respect to a distributed content item or set of content items (e.g., number of impressions, number of clicks, number of conversions, revenue, attributable purchases, etc.).

Still referring to FIG. 1, computer system 100 is shown to include user devices 108. User devices 108 may include any number and/or type of user-operable electronic devices. For example, user devices 108 may include desktop computers, laptop computers, smartphones, tablets, mobile communication devices, remote workstations, client terminals, entertainment consoles, or any other devices capable of interacting with the other components of computer system 100 (e.g., via a communications interface). For example, user devices 108 may be capable of receiving resource content from resources 104 and/or third-party content items from content providers 106 or content server 112. User devices 108 may include mobile devices or non-mobile devices.

In some implementations, user devices 108 include an application (e.g., a web browser, a resource renderer, etc.) for converting electronic content into a user-comprehensible format (e.g., visual, aural, graphical, etc.). User devices 108 may include a user interface element (e.g., an electronic display, a speaker, a keyboard, a mouse, a microphone, a printer, etc.) for presenting content to a user, receiving user input, and/or facilitating user interaction with electronic content (e.g., clicking on a content item, hovering over a content item, etc.). User devices 108 may function as a user agent for viewing HTML encoded content. User devices 108 may include a processor capable of processing embedded information (e.g., meta information embedded in hyperlinks, etc.) and executing embedded instructions. Embedded instructions may include computer-readable instructions (e.g., software code, JavaScript®, ECMAScript®, etc.) associated with a content slot within which a third-party content item is presented.

In some implementations, user devices 108 may be capable of detecting an interaction with a distributed content item. An interaction with a content item may include displaying the content item, hovering over the content item, clicking on the content item, viewing source information for the content item, or any other type of interaction between user devices 108 and a content item. Interaction with a content item does not require explicit action by a user with respect to the content item. In some implementations, an impression (e.g., displaying or presenting the content item) may qualify as an interaction. The criteria for defining which user actions (e.g., active or passive) qualify as an interaction may be determined on an individual basis (e.g., for each content item), by content providers 106 (e.g., according to established campaign parameters), or by content server 112.

Still referring to FIG. 1, computer system 100 is shown to include data storage devices 110. Data storage devices 110 may be any type of memory device capable of storing profile data, content item data, or any other type of data used by content server 112. Data storage devices 110 may include any type of non-volatile memory, media, or memory devices. For example, data storage devices 110 may include semiconductor memory devices (e.g., EPROM, EEPROM, flash memory devices, etc.) magnetic disks (e.g., internal hard disks, removable disks, etc.), magneto-optical disks, and/or CD-ROM and DVD-ROM disks. In some implementations, data storage devices 110 may be local to content server 112 or content providers 106. In other implementations, data storage devices 110 may be remote data storage devices connected with content server 112 via network 102. In some implementations, data storage devices 110 may be part of a data storage server or system capable of receiving and responding to queries from content server 112.

In some implementations, data storage devices 110 store profile data for user devices 108. Profile data may include, for example, interest data, behavioral data, or other data which may be relevant in selecting content items for distribution to user devices 108. Profile data stored in data storage devices 108 may also be used (e.g., by content server 112) to select and/or rank potential navigation filters for inclusion with a content item.

For situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated (e.g., by content server 112) in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected (e.g., by an application, by user devices 108, etc.) and used by content server 112. In some implementations, content providers may be provided with similar control options regarding the collection and use of content provider data (e.g., data associated with particular content providers, data extracted from a resource, etc.).

Still referring to FIG. 1, computer system 100 is shown to include a content server 112. Content server 112 may be configured to receive requests for content items from user devices 108 and select an eligible content item in response to the request. The selected content item may be associated with a particular resource (e.g., a landing page) to which a user device is directed (e.g., via an embedded hyperlink) in response to interacting with the content item. Content server 112 may integrate one or more navigation filters with the content item and distribute the content item and the integrated navigation filters to user devices 108. Integrating a navigation filter with a content item may include appending the navigation filter to the content item or replacing a portion of the content item with the navigation filter.

In some implementations, content server 112 is configured to automatically generate navigation filters for a content item using data extracted from the target resource. For example, content server 112 may receive a set of data entries (e.g., raw textual data) representing potential headings and potential items for inclusion in a navigation filter. Content server 112 may normalize the data entries to convert the raw textual data into a standard form and parse the content of the target resource to identify occurrences of the normalized data entries therein. Content server 112 may determine a path to each of the identified occurrences of a normalized data entry in the target resource and use the determined paths to construct a query for additional navigation filter content (e.g., additional headings, additional items, etc.) that have the same path as an identified occurrence of a normalized data entry. Content server 112 may generate a navigation filter by associating one or more of the potential navigation filter items with a potential navigation filter heading. In some implementations, content server 112 may receive the navigation filters directly from content providers 106 via a management interface.

In some implementations, content server 112 is configured to automatically rank or filter the navigation filters to determine which of the potentially applicable navigation filters to integrate with a content item. In some implementations, the ranking may be based on the keywords of a search query which led to the selection of a particular content item, information associated with user device 108 from with the request for content is received (e.g., interest categories, behavioral information, etc.) and/or the layout or structure of the target resource. In other implementations the ranking and filtering may be specified by content providers 106 rather than an automated ranking process. Content server 112 is described in greater detail with reference to FIG. 2.

Figure 2:
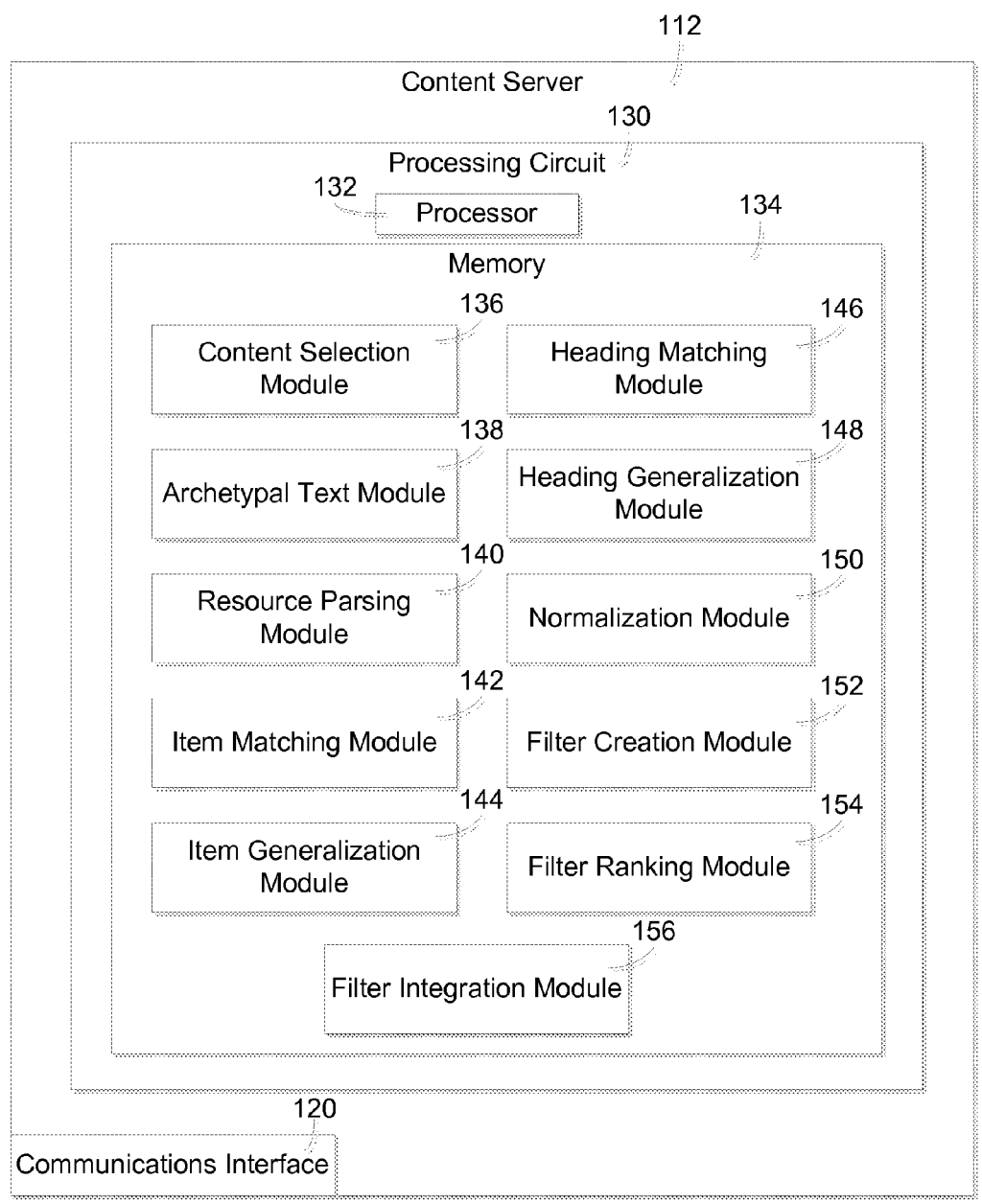
FIG. 2 is a block diagram showing the content server of FIG. 1 in greater detail, illustrating several memory modules configured to extract data from a resource, normalize and filter the extracted data, generate navigation filters associated with the resource, rank a set of navigation filters, and integrate navigation filters with a content item, according to a described implementation.

Referring now to FIG. 2, a block diagram illustrating content server 112 in greater detail is shown, according to a described implementation. Content server 112 is shown to include a communications interface 120 and a processing circuit 130. Communications interface 120 may include wired or wireless interfaces (e.g., jacks, antennas, transmitters, receivers, transceivers, wire terminals, Ethernet ports, WiFi transceivers, etc.) for conducting data communications with local or remote devices or systems. For example, communications interface 120 may allow content server 112 to communicate with network 102, resources 104, content providers 106, user devices 108, and data storage devices 110.

Still referring to FIG. 2, processing circuit 130 is shown to include a processor 132 and memory 134. Processor 132 may be implemented as a general purpose processor, an application specific integrated circuit (ASIC), one or more field programmable gate arrays (FPGAs), a CPU, a GPU, a group of processing components, or other suitable electronic processing components.

Memory 134 may include one or more devices (e.g., RAM, ROM, flash memory, hard disk storage, etc.) for storing data and/or computer code for completing and/or facilitating the various processes, layers, and modules described in the present disclosure. Memory 134 may comprise volatile memory or non-volatile memory. Memory 134 may include database components, object code components, script components, or any other type of information structure for supporting the various activities and information structures described in the present disclosure. In some implementations, memory 134 is communicably connected to processor 132 via processing circuit 130 and includes computer code (e.g., data modules stored in memory 134) for executing one or more processes described herein. In brief overview, memory 134 is shown to include a content selection module 136, an archetypal text module 138, a resource processing module 140, an item matching module 142, an item generalization module 144, a heading matching module 146, a heading generalization module 148, a normalization module 150, a filter creation module 152, a filter ranking module 154, and a filter integration module 156.

Still referring to FIG. 2, memory 134 is shown to include a content selection module 136. Content selection module 136 may receive a request for a content item (e.g., via communications interface 120) from resources 104 and/or user devices 108. In some implementations, the request for content items may include characteristics of one or more content slots in which the content items will be displayed. For example, such characteristics may include the URL of the resource 104 in which the content slot is located, a display size of the content slot, a position of the content slot, and/or media types that are available for presentation in the content slot. If the content slot is located on a search results page, keywords associated with the search query may also be provided to content selection module 136. The characteristics of the content slot and/or keywords associated with the content request may facilitate identification of content items that are relevant to resources 104 and/or to the search query.

Content selection module 136 may select an eligible content item in response to the request received from resources 104 or user devices 108. In some implementations, eligible content items include content items having characteristics matching the characteristics of the content slots in which the content items are to be presented. For example, content selection module 136 may select a content item having a display size which fits in a destination content slot. In some implementations, content selection module 136 may resize a selected content item to fit a content slot or add additional visual content to the selected content item (e.g., padding, a border, etc.) based on the display size of the content item and the display size of the content slot.

In some implementations, content selection module 136 selects a content item determined to be relevant to particular resource 104, user device 108, or search query. For example, content selection module 136 may select a content item by comparing the keywords associated with each content item (e.g., specified by content providers 106, additional keywords extracted from the content item, etc.) with the keywords associated with the resource 104 or user device 108 requesting the content item. A topic or type of content included in resources 104 may be used to establish keywords for resources 104.

In some implementations, content selection module 136 may select a content item by comparing the keywords associated with each content item with information (e.g., profile data, user interests, user preferences, etc.) associated with a particular user device 108 requesting the content item. In some implementations, content selection module 136 selects a content item based on user profile information independent from a particular user device. For example, if a user device is logged into an online account or profile through a user device, information associated with the account or profile (e.g., demographic information, user interests, user preferences, etc.) may be used to select a content item for distribution to the user device. A user device may be associated with one or more users, user accounts, and/or user profiles. In some implementations, content selection module 136 may select a content item that does not match established user preferences if an insufficient number of preferred content items are available. In some implementations, content selection module 136 may select a content item based on an established click-through-rate, a predicted click-through-rate, a bid price associated with each content item, or other relevant selection criteria.

In some implementations, the selected content item is transmitted to resources 104 for presentation to user devices 108 along with any requested resource content from resources 104. In other implementations, the selected content item is delivered to the user devices 108 directly (e.g., without first transmitting the content item to resources 104) from content server 112 or from data storage devices 110. Content selection module 136 may assign each content item a unique identifier (e.g., a signature attribute) for measuring or recording user interactions with distributed content items.

In some implementations, the content items selected by content selection module 136 may be advertisements. The advertisements may be display advertisements such as image advertisements, animated advertisements, video advertisements, text-based advertisements, or any combination thereof. In other implementations, the content items may include other types of content which serve various non-advertising purposes. Content items may be associated with a target resource. For example, content items may include a hyperlink which directs user devices 108 to a specific URL (e.g., a "target URL" given by a href attribute) when the content item is clicked. The target URL of a content item may define the location of the target resource associated with the content item. Content selection module 136 may provide the target URL of the selected content item to resource processing module 140.

Still referring to FIG. 2, memory 134 is shown to include an archetypal text module 138. Archetypal text module 138 may be configured to receive a set of data entries representing archetypal headings and/or archetypal items for a navigation filter. Archetypal headings and archetypal items may be predetermined examples of textual data representing headings or items that would be suitable for use in a navigation filter (e.g., golden examples, golden text, etc.). A set of archetypal items may include a plurality of conceptually parallel items that vary with respect to a specific heading type. For example, for the heading type "Brands," a set of archetypal items may include various brand names, entity names, trademarks, service marks, or other identifiers that can be used to classify or filter by a brand attribute. For the heading type "Colors," a set of archetypal items may include various colors that can be used to classify or filter by a color attribute. Archetypal headings may represent various attributes (e.g., color, brand, price, geographic location, size, model, style, condition, etc.) that can be used to filter or sort a set of products, services, promotions, locations, or other items displayed on the target resource.

In some implementations, archetypal text module 138 loads the archetypal data entries from a key-value lookup table. For example, archetypal headings and/or archetypal items may be stored in a key-value lookup table as a list of text strings. The key-value lookup table may be stored locally (e.g., in memory 134) or remotely (e.g., in data storage devices 110). In some implementations, archetypal text module 138 loads the archetypal data entries from a configuration file or a configuration table. The configuration file/table may specify the archetypal data entries explicitly, implicitly, or by reference to another data source. For example, the following configuration table specifies that archetypal headings are given by the regular expression "(Featured|Top)? (Brands?|Designers?)" (i.e., Featured Brands, Featured Designers, Top Brands, or Top Designers) and that archetypal items are stored in the key-value lookup table located at ""/some_path/table." In some implementations, the table is a sorted string table and a protocol buffer is used to provide the configuration settings.

| config_id | brands_by_entities |
|---|---|
| url_pattern_re pattern | ^.*$ |
| | name brands_by_entities |
| | parser 2 |
| | heading_mode 2 |
| | heading_query (Featured |Top ) ? (Brands?|Designers? ) |
| | heading_query Brands |
| | link_mode 4 |
| | link_query /some_path/table |
| | link_query (?i)^(?:\\PL+) ? (?:The |A |An )?(.+? ) ( ? :,| | Group| Inc\\.? | Incorporated| Company| Co\\.?| Ltd\\.?| Corp\\.?| Corporation| Limited| International| Brand|\\.com|\\.net|\\.org) * (?:\\PL+)? |

In the table above, the value of the parser field (i.e., parser=2) may specify that the configuration employs a generalization from archetypal data. The value of the heading mode field (i.e., heading mode=2) may specify that the first heading_query is a regular expression indicating the potential variants of the archetypal data and that the second heading_query is the archetypal heading text to which those text variants will be mapped. The value of the link_mode field (i.e., link_mode=4) may specify that the first link_query is a path to a table of archetypal items and the second link_query specifies the normalization regular expression.

In some implementations, archetypal text module 138 normalizes the archetypal data entries to convert the raw textual data into a standard form. For example, normalizing the data entries may include removing extraneous punctuation or numbers, trimming whitespace, standardizing casing, adjusting plurality, removing prefixes, suffixes, or other modifiers, or otherwise adjusting the data entries. Normalization rules and procedures may be specified in the configuration table or received from another data source. For example, using the configuration table provided above, archetypal text module 138 may normalize any heading which matches the regular expression provided in the first heading query (i.e., "(Featured|Top)?(Brands?|Designers?)") to the normalized text string provided in the second heading query (i.e., "Brands"). The normalized headings generated by archetypal text module 138 may be used as potential navigation filter headings.

Using the configuration table provided above, archetypal text module 138 may normalize each of the archetypal items provided in the key-value lookup table specified in the first link query (i.e., "/some_path/table") using the regular expression provided in the second link query (i.e., "(?i)^(?:\\PL+)?(?:The|A|An)?(.+?)(?:,||Group|Inc\\.?|Incorporated| Company|Co\\.?|Ltd\\.?|Corp\\.?|Corporation|Limited|International|Brand|\\.com|\\.net|\\.org)*(?:\\PL+)?"). Using this regular expression, archetypal text module 138 may normalize archetypal items by removing the prefixes "The," "A," and "An," and the suffixes "Group," "Inc.," "Incorporated," "Company," "Co.," "Ltd.," "Corp.," "Corporation," "Limited," "International," "Brand," ".com," ".net," and ".org." For example, the archetypal item "Domain.com" would be normalized to "Domain" and the archetypal item "Swimwear International Limited" would be normalized to "Swimwear." The normalized items generated by archetypal text module 138 may be used as potential navigation filter items. In the key-value lookup table, the value may be the pre-normalization archetypal item text and the key may be a unique identifier for the value entry. In some implementations, the key may be used to map additional metadata to the pre-normalization item text.

Still referring to FIG. 2, memory 134 is shown to include a resource parsing module 140. Resource parsing module 140 may be configured to parse the content and/or structure of the target resource and to generate a representation thereof. For example, resource parsing module 140 may generate a document object model (DOM) tree, a hierarchical representation, a parsed HTML representation, or any other representation of the target resource. Resource parsing module 140 may be configured to manage, store, serialize, and/or discover indexed collections of spans (e.g., begin-end intervals) associated with arbitrary data of the target resource. Resource parsing module 140 may annotate various elements of the target resource (e.g., HTML elements, attributes or contents of HTML elements, etc.) such that the target resource can be easily traversed by subsequent systems or processes.

In some implementations, resource parsing module 140 is configured to identify various types of textual data provided in the target resource. For example, resource parsing module 140 may identify markup tags such as HTML image tags (e.g., <img>), hyperlink tags (e.g., <a>), heading tags (e.g., <h1>, <h2>, . . . <h9>), unordered list tags (e.g., <ul>), list item tags (e.g., <li>), and other types of markup tags for HTML or non-HTML content. In some implementations, resource parsing module 140 filters out (e.g., removes, omits, etc.) all image tags from the parsed representation of the target resource. By filtering image tags, resource parsing module 140 may avoid including redundant information which may be provided in the alt text of image tags. In some implementations, resource parsing module 140 generates the parsed representation from an indexed version of the target resource (e.g., a previously-crawled or annotated version). The indexed version of the target resource may be created by parsing the raw content of the target resource (e.g., HTML content) into a more easily manipulable form.

In some implementations, resource parsing module 140 generates a parsed representation of the target resource in response to receiving a request from user devices 108 for a content item that directs to the target resource. For example, resource parsing module 140 may generate the parsed representation of the target resource subsequent to receiving a request for a content item, prior to selecting a content item in response to the request and/or after selecting a content item in response to the request. In other implementations, resource parsing module 140 generates the parsed representation of the target resource prior to receiving the request for content from the user devices 108 (e.g., a priori). Generating the parsed representation prior to receiving a request for content and/or prior to selecting a content item may reduce serving latency (e.g., the time required to generate a content item with integrated navigation filters and provide the content item to a user device).

In some implementations, resource parsing module 140 provides information extracted from the target resource to content selection module 136. The extracted information be used as a high-quality signal representing the content of the target resource. Content selection module 136 may use the extracted information to match user query terms and/or interests with relevant content items. For example, the information extracted from a target resource may be stored as keywords associated with the target resource. Content selection module 136 may select a content item linking to the target resource in response to a search query containing one of the stored keywords.

Still referring to FIG. 2, memory 134 is shown to include an item matching module 142. Item matching module 142 may be configured to identify occurrences of the normalized archetypal data entries in the target resource. For example, item matching module 142 may receive or load a set of data entries that include archetypal items (e.g., from a key-value lookup table, from data storage devices 110, etc.). In some implementations, the data entries may be normalized (e.g., according to a regular expression specified in a configuration file or table) to convert the data entries into a standard form.

In some implementations, item matching module 142 filters the set of archetypal items. Item matching module 142 may remove an item from the set of archetypal items if the dominant interpretation of the item does not match a defined heading type. For example, for a set of brand-related items, item matching module 142 may filter the set to remove items that are not brands or which have a dominant interpretation that is not a brand.

In some implementations, item matching module 142 determines or obtains one or more interpretations of each archetypal item. Each interpretation may be scored according to the likelihood or confidence of the interpretation. For example, for the term "Red," the most likely or common interpretation might be the color red, regardless of whether "Red" is also a brand name. Item matching module 142 may identify the dominant (e.g., highest scoring) interpretation of each archetypal item using the confidence scores associated therewith.

Item matching module 142 may determine whether the dominant interpretation of each archetypal item matches a defined heading type. For example, for the heading type "Brands," item matching module 142 may determine whether the dominant interpretation of an archetypal item is a brand, a designer, an employer, or a business. If the dominant interpretation of an archetypal item, does not match the defined heading type, item matching module 142 may filter or remove the archetypal item from the set.

Item matching module 142 may search the content of the target resource for text strings that match one or more of the normalized archetypal items. For example, if one of the normalized archetypal items is the text string "Brand A," item matching module 142 may search the content of the target resource for instances of the text string "Brand A." In various implementations, item matching module 142 may search for occurrences of the normalized archetypal items in the unmodified content of the target resource or the parsed representation of the target resource generated by resource parsing module 140.

In some implementations, item matching module 142 assumes that all navigation filter items are associated with hyperlinks and searches for text strings that match a normalized archetypal item in only the content areas of the target resource that are associated with hyperlinks. For example, item matching module 142 may parse the target resource (or a representation thereof) to identify hyperlinks by searching for hyperlink markup tags. In other implementations, item matching module 142 receives a listing or other indication of previously-identified hyperlinks from resource parsing module 140. Item matching module 142 may test each of the identified hyperlinks (e.g., in HTML position order) to determine whether the content text associated with the hyperlink matches a normalized archetypal item. In other implementations, item matching module 142 searches other content areas of the target resource for text string matches in addition to the content areas associated with hyperlinks.

Item matching module 142 may mark a hyperlink or other tag of the target resource with a navigation filter item annotation in response to a determination that the content text associated with the hyperlink or other tag matches one or more of the normalized archetypal items. The navigation filter item annotation may indicate that the annotated tag of the target resource includes a text string that can be used as a potential navigation filter item. Item matching module 142 may store each identified occurrence of a normalized archetypal item as a potential navigation filter item. For example, if item matching module 142 identifies the hyperlink <a href="/some_path_A.html">Brand A</a> as a content element of the target resource that includes a text string (e.g., "Brand A") matching a normalized archetypal item, item matching module 142 may extract and/or store the link text (e.g., "Brand A") as a text string that can be used as a potential navigation filter item. In some implementations, item matching module 142 extracts and/or stores the link URL (e.g., "/some_path_A.html") in addition to the link text.

Item matching module 142 may determine a path to each identified occurrence of a normalized archetypal item in the target resource. The path may be an XPath, an XPath-like variant, a URL path, or other path indicating a particular location within the content of the target resource (e.g., identifying a particular tag, a particular section, etc.). Item matching module 142 may determine the path to each identified occurrence of a normalized archetypal item identifying and traversing annotations (e.g., HTML tags) within the target resource. Item matching module 142 may use a textual query, similar to XPath, to traverse the annotations of the target resource.

Item matching module 142 may select a path to each identified occurrence from a plurality of potential paths that lead to the same element of the target resource. In some implementations, item matching module 142 selects the path from the root HTML tag to the identified occurrence of the normalized archetypal item. Item matching module 142 may identify a root element of the target resource and determine a path from the root element to the identified occurrence of the normalized archetypal item. For example, for the HTML code snippet:

```
<html>
  <div>
    <ul>
      <li>
        <a href="/some_path_A.html">Brand A</a>
      </li>
      <li>
        <a href="/some_path_B.html">Brand B</a>
      </li>
    </ul>
  </div>
``` item matching module 142 may determine that the path from the root element <html> to the first hyperlink element <a> is "/div/ul/li/a." Item matching module 142 may store the path from the root element to the normalized archetypal item and/or provide the path to item generalization module 144.

Still referring to FIG. 2, memory 134 is shown to include an item generalization module 144. Item generalization module 144 may be configured to use the path to an identified occurrence of a normalized archetypal item (i.e., an item that can be used as a potential navigation filter item) to construct a query for additional potential navigation filter items. In some implementations, item generalization module 144 searches the content of the target resource for elements that have the same path as the path to an identified occurrence of a normalized archetypal item. Item generalization module 144 may search for hyperlinks or other tags of the target resource that have the same path as the path to an identified occurrence of a normalized archetypal item. For example, in the HTML code snippet provided above, the second hyperlink element (i.e., <a href="/some_path_B.html">Brand B</a>) and the first hyperlink element (i.e., <a href="/some_path_A.html">Brand A</a>) have the same path from the <html> root element (i.e., "/div/ul/li/a").

In some implementations, item generalization module 144 assumes that all navigation filter items are associated with hyperlinks and searches for additional potential navigation filter items in only the content areas of the target resource that are associated with hyperlinks. For example, item generalization module 144 may identify one or more hyperlinks that have the same path as the path to an identified occurrence of a normalized archetypal item. In other implementations, item generalization module 144 searches other content areas of the target resource in addition to the content areas associated with hyperlinks.

Item generalization module 144 may mark a hyperlink or other tag of the target resource with a navigation filter item annotation in response to a determination that the content text associated with the hyperlink or other tag has the same path as a normalized archetypal item. The navigation filter item annotation may indicate that the annotated tag of the target resource includes a text string that can be used as a potential navigation filter item. Item generalization module 144 may store a textual portion of each identified tag (e.g., link text, a name attribute, a title attribute, etc.) as a potential navigation filter item. For example, if item generalization module 144 identifies the hyperlink <a href="/some_path_B.html">Brand B</a> as a content element of the target resource that has the same path as the path to an identified occurrence of a normalized archetypal item, item generalization module 144 may extract and/or store the link text "Brand B" as a text string that can be used as a potential navigation filter item.

Still referring to FIG. 2, memory 134 is shown to include a heading matching module 146. Heading matching module 146 may be configured to identify occurrences of archetypal data entries in the target resource. Heading matching module 146 may load or receive archetypal headings from a configuration table or another data source. In various implementations, archetypal headings may be provided to heading matching module 146 as a regular expression, a list, a table (e.g., data entries in a key-value lookup table), or other data structure. For example, the regular expression "(Featured|Top)?(Brands?|Designers?)" specifies the archetypal headings "Brands," "Designers," "Brand," "Designer," Featured Brand," "Featured Designer," "Top Brand," "Top Designer," "Featured Brands," "Featured Designers," "Top Brands," and "Top Designers." In some implementations, the archetypal headings are normalized to convert the raw textual data into a standard form.

Heading matching module 146 may search the content of the target resource for text strings that match one or more of the archetypal headings. For example, if one of the archetypal headings is the text string "Featured Brands," heading matching module 146 may search the content of the target resource for instances of the text string "Featured Brands." In various implementations, heading matching module 146 may search for occurrences of the archetypal headings in the unmodified content of the target resource or the parsed representation of the target resource generated by resource parsing module 140.

In some implementations, heading matching module 146 searches the content of the target resource for tags (e.g., hyperlink tags <a>, heading tags <h1>, <h2>, . . . <h9>, list tags <ul>, <li>, etc.) having content that matches an archetypal heading. Heading matching module 146 may test each tag of the target resource (e.g., in HTML position order) to determine whether the content text associated with the tag matches an archetypal heading. Heading matching module 146 may search all tags of the target resource for matching content regardless of whether the tag is an actual HTML heading tag (e.g., <h1>, <h2>, . . . <h9>). For example, heading matching module 146 may determine that the content of the tag <h2> in the following HTML code snippet matches the "Featured Brands" archetypal heading.

```
<html>
  <div>
    <h2>Featured Brands</h2>
      <p>
        <a>Brand A</a>
      </p>
      <p>
        <a>Brand B</a>
      </p>
    <h2>Special Offers</h2>
      <p>
        <a>Product A</a>
      </p>
      <p>
        <a>Product B</a>
      </p>
  </div>
```

In some implementations, heading matching module 146 searches for content that matches an archetypal heading within leaf nodes of the target resource. Heading matching module 146 may receive a DOM representation of the target resource and identify one or more leaf nodes of the target resource using the DOM representation thereof. Heading matching module 146 may ignore tags of the target resource that are not leaf nodes while searching for archetypal headings. For example, heading matching module 146 may ignore the heading tag <h2>Featured Brands<ul><li><a>Brand A</a></li> . . . </h2> because the heading tag <h2> is not a leaf node. In some implementations, heading matching module 146 excludes children of links while searching for archetypal headings. Heading matching module 146 may exclude, omit, or remove a tag from consideration as a potential navigation filter heading in response to a determination that the tag is not a leaf node and/or in response to a determination that the tag is a child node of a hyperlink element. In other implementations, heading matching module 146 searches for archetypal headings in all tags of the target resource regardless of whether the tag is a leaf node and/or a child node of a hyperlink.

Heading matching module 146 may mark a tag of the target resource with a navigation filter heading annotation in response to a determination that the content text associated with the tag matches one or more of the archetypal headings. The navigation filter heading annotation may indicate that the annotated tag of the target resource includes a text string that represents a potential navigation filter heading. In some embodiments, occurrences of archetypal headings in the target resource may be normalized prior to use as a potential navigation filter heading. For example, the configuration table used by heading matching module 146 to identify occurrences of archetypal headings may specify that any heading matching the regular expression "(Featured|Top)? (Brands?|Designers?)" will be normalized to the potential navigation filter heading "Brands."

Heading matching module 146 may determine a path to each identified occurrence of an archetypal heading in the target resource. The path may be an XPath, a variant of the XPath, a URL path, or other path indicating a particular location within the content of the target resource (e.g., identifying a particular tag, a particular section, etc.). Heading matching module 146 may select a path to each identified occurrence from a plurality of potential paths that lead to the same element of the target resource. Heading matching module 146 may identify a root element of the target resource and determine a path from the root element to the identified occurrence of the archetypal heading. In some implementations, heading matching module 146 selects the path from the root HTML tag to the identified occurrence of the archetypal heading as the unique path to the archetypal heading. For example, in the HTML code snippet provided above, the path to the <h2> tag is "/div/h2."

Still referring to FIG. 2, memory 134 is shown to include a heading generalization module 148. Heading generalization module 148 may be configured to use the path to an identified occurrence of an archetypal heading in the target resource to construct a query for additional headings that can be used as potential navigation filter headings. In some implementations, heading generalization module 148 searches the content of the target resource for elements that have the same path as the path to an identified occurrence of an archetypal heading.

Heading generalization module 148 may search for tags or other elements of the target resource that have the same path as the path to an identified occurrence of an archetypal heading. For example, in the HTML code snippet provided above, heading generalization module 148 may search for additional navigation filter headings that have the same path as the archetypal "Featured Brands" heading (i.e., "/div/h2").

In some implementations, heading generalization module 148 assumes that all navigation filter headings are leaf nodes. In some implementations, heading generalization module 148 assumes that all navigation filter headings are not child nodes of hyperlinks Heading generalization module 148 may search for additional potential navigation filter headings in only the content areas of the target resource that are associated leaf nodes and/or nodes that are not child nodes of hyperlinks. In other implementations, heading generalization module 148 searches other content areas of the target resource in addition to the content areas associated with leaf nodes and/or nodes that are not children of hyperlinks.

In some implementations, heading generalization module 148 assumes that navigation filter headings and navigation filter items share a common immediate parent. For example, in the HTML code snippet provided above, the heading "Featured Brands" and the items "Brand A" and "Brand B" share the common immediate parent "<div>." In some implementations, the common immediate parent may be the heading itself (e.g., in cases where the heading element is not a leaf node, and the heading element contains within it the items as well). In some implementations, heading generalization module 148 identifies archetypal headings that share a common immediate parent with a threshold number of archetypal items (e.g., two or more, three or more, etc.). Heading generalization module 148 may mark or identify such headings as a high-confidence heading. In some implementations, heading generalization module 148 may search for additional potential navigation filter headings in only the content areas of the target resource that have the same path as high-confidence headings.

Heading generalization module 148 may mark a tag or other element of the target resource with a navigation filter heading annotation in response to a determination that the content text associated with the tag or other element has the same path as an archetypal heading. The navigation filter heading annotation may indicate that the annotated tag of the target resource includes a text string that can be used as a potential navigation filter heading. Heading generalization module 148 may store a textual portion of each identified tag or other element (e.g., heading text, link text, a name attribute, a title attribute, etc.) as a potential navigation filter heading. For example, if heading generalization module 148 identifies the heading <h2>Special Offers</h2> as a content element of the target resource that has the same path as the path to an identified occurrence of an archetypal heading (e.g., "/div/h2"), heading generalization module 148 may extract and/or store the heading text "Special Offers" as a text string that can be used as a potential navigation filter heading.

Still referring to FIG. 2, memory 134 is shown to include a normalization module 150. Normalization module 150 may convert the literal text of a potential navigation filter item and/or a potential navigation filter heading into a standard form. In some implementations, normalization module 150 uses normalization rules specified via a configuration file or table to normalize the raw textual data of the various potential navigation filter elements. For example, normalization module 150 may rename all potential navigation filter headings that match a regular expression to a predefined heading text (e.g., renaming any heading that matches the regular expression "(Featured|Top)?(Brands?|Designers?)" to the normalized navigation filter heading "Brands").

Normalization module 150 may remove extraneous punctuation and numbers, trim whitespace, and standardize casing (e.g., translating capital letters into lowercase letters, capitalizing words, etc.). Normalization module 150 may convert plural terms to singular terms (or vice versa), and strip suffixes or prefixes. For example, the literal text "CAMERAS (4)" may be normalized to simply "Camera."

In some implementations, normalization module 150 may classify headings as one or more of a standard set of heading types (e.g., selected from a predetermined list) and optionally rename the heading based on the standardized heading type. Normalization module 150 may accept configuration settings for activating, deactivating, or customizing various normalization options. Configuration settings may be stored in a configuration file or table in memory 134 or in an external data source (e.g., data storage devices 110).

In some implementations, normalization module 150 performs exclusion filtering of the normalized potential navigation filter items and headings. For example, if the normalization procedure performed by normalization module 150 results in an empty normalized text string for a heading or item, normalization module 150 may delete the heading or item. Normalization module 150 may discard headings or items that contain specified strings such as "see more," "see all," or other nonspecific groupings. Discarding a heading or item may remove the discarded heading or item from further consideration as a potential navigation filter element. As an alternative to deletion, normalization module 150 may mark an item or heading, or menu in such a way that the item or heading is disqualified from further consideration.

Still referring to FIG. 2, memory 134 is shown to include a filter creation module 152. Filter creation module 152 may generate navigation filters by associating one or more of the potential navigation filter items with one of the potential navigation filter headings. In some implementations, filter creation module 152 accepts input from data modules 138-150 to generate navigation filters based on the content and/or structure of the target resource. In other implementations, filter creation module 152 may accept input directly from content providers 106 rather than using headings and items extracted from the target resource.

Filter creation module 152 may analyze the content of the target resource (or a parsed representation thereof) to identify potential navigation filter headings and potential navigation filter items. For example, filter creation module 152 may search for tags or other elements of the target resource that have been marked with a navigation filter item annotation (e.g., by item matching module 142 and/or item generalization module 144) or a navigation filter heading annotation (e.g., by heading matching module 146 and/or heading generalization module 148).

Filter creation module 152 may determine a text string associated with each annotation. In various implementations, the text string may be literal text extracted from the annotated element of the target resource (e.g., link text, heading text, alt text, etc.), normalized text generated by normalization module 150 (e.g., normalized versions of the text extracted from the target resource), renamed text (e.g., a renamed heading based on a renaming rule provided in a configuration file/table), or other text that can be used as a navigation filter heading and/or a navigation filter item.

Filter creation module 152 may determine a sequence in which the potential navigation filter headings and potential navigation filter items appear in the target resource. In some implementations, filter creation module 152 arranges the text strings associated with each annotation in a sequence defined by the HTML position of the corresponding annotations. Filter creation module 152 may identify each element of the sequence as a potential navigation filter heading or a potential navigation filter item. For example, filter creation module 152 may generate the sequence H:Brands, I:Brand A, I:Brand B, H:Colors, I:Blue, I:Red, I:Green where the identifier "H" marks the element as a potential navigation filter heading and the identifier "I" marks the element as a potential navigation filter item.

Filter creation module 152 may generate navigation filters by associating each potential navigation filter heading with one or more potential navigation filter items. In some implementations, filter creation module 152 associates each potential navigation filter item with the potential navigation filter heading immediately preceding the potential navigation filter item in the sequence. In other words, filter creation module 152 may associate each potential navigation filter heading with one or more potential navigation filter items that occur after the potential navigation filter heading in the sequence but before the next potential navigation filter heading in the sequence. For example, for the sequence provided above, filter creation module 152 may create a first navigation filter with the heading "Brands" and items "Brand A" and "Brand B" and a second navigation filter with the heading "Colors" and the items "Blue," "Red," and "Green."

In some implementations, filter creation module 152 uses additional heuristics to associate potential navigation filter items with a potential navigation filter heading. For example, filter creation module 152 may determine or assume that the first potential navigation filter item ($I_1$) immediately following a first potential navigation filter heading ($H_1$) is most likely to be truly associated with the first potential navigation filter heading $H_1$. Accordingly, filter creation module 152 may associate item $I_1$ with heading $H_1$. Filter creation module 152 may determine the path ($X_1$) to item $I_1$ (e.g., the unique path from the root HTML element to item $I_1$) and the most recent common ancestor ($MRCA_1$) of both heading $H_1$ and item $I_1$ (e.g., the most recent common ancestor in a document object model representation of the target resource). For each additional potential navigation filter item ($I_2 \ldots I_n$) between heading $H_1$ and the next potential navigation filter heading ($H_2$), filter creation module 152 may determine the paths ($X_2 \ldots X_n$) to each respective item $I_2 \ldots I_n$ and the most recent common ancestor ($MRCA_2 \ldots MRCA_n$) of each respective item $I_2 \ldots I_n$ with heading $H_1$. In some implementations, filter creation module 152 associates an item (e.g., one of items $I_2 \ldots I_n$) with heading $H_1$ only if the path to the item (e.g., one of paths $X_2 \ldots X_n$) is the same as path $X_1$. In some implementations, filter creation module 152 associates an item (e.g., one of items $I_2 \ldots I_n$ with heading $H_1$ only if the most recent common ancestor of the item and $H_1$ (e.g., one of $MRCA_2 \ldots MRCA_n$) is the same as $MRCA_1$.

In some implementations, filter creation module 152 creates navigation filters having a single heading and a plurality of conceptually parallel items within the heading. In some implementations, the conceptually parallel items may have variation along a single dimension. The dimension of variation may be defined by the heading of the navigation filter. For example, in response to a search query for "desktop hard drives," content selection module 136 may select a content item associated with an online retailer of computer hardware. Filter creation module 152 may identify the heading "Capacity" among the headings extracted from the retailer's landing page and generate a list of conceptually parallel items which vary along the "Capacity" dimension (e.g., 500 GB, 1 TB, 2+TB, etc.). As another example, for the heading "Brands," filter creation module 152 may generate a list of conceptually parallel items which vary along the "Brands" dimension (e.g., Brand A, Brand B, Brand C, etc.).

By ensuring that a navigation filter includes only conceptually parallel items, filter creation module 152 can generate navigation filters which follow the hierarchical structure of the target resource and/or which summarize the content of the target resource in a way that is easy for users to understand. This capability provides a distinct advantage over alternative approaches which group conceptually unrelated items. For example, if a user device submits a search query for "flowers," extracting and presenting items from a target resource without assuring that the items vary along only a single dimension could produce a list such as "Roses," "30% off," and "Free Shipping." These items are not conceptually parallel and do not adequately summarize the various types of flowers the target resource has to offer.

Still referring to FIG. 2, memory 134 is shown to include a filter ranking module 154. Filter ranking module 145 may rank both the headings and items of various navigation filters to determine which of the headings and items to include with the selected content item. In some implementations, filter ranking module 154 ranks only the headings or only the items. In other implementations, filter ranking module 154 ranks both the headings and the items. In some implementations, filter ranking module 154 accepts input from filter creation module 152 and ranks the generated navigation filters extracted from the target resource. In other implementations, filter ranking module 154 receives a set of navigation filters from content providers 106 (e.g., via a management interface) and ranks multiple navigation filters submitted by content providers 106.

In some implementations, filter ranking module 154 references a globally ordered list of headings and ranks potential headings based on the order of the headings in the list. Filter ranking module 154 may be provided with multiple lists corresponding to different interest categories (e.g., vertical categories, topics of interest, etc.). The multiple lists may rank potential headings differently. Filter ranking module 154 may select a list based on the keywords submitted as part of a search query and/or the type or category of the selected content item. For example, a user may find different information useful for camera purchases than for booking a cruise. Filter ranking module 154 may use some or all of the indicators used to select a relevant content item (e.g., interest categories, search keywords, user information, etc.) in selecting a list to rank the navigation filter headings. Headings in the lists may be organized by normalized types (e.g., enum types, categories, etc.) to maintain the manageability of the ordered lists.

In some implementations, filter ranking module 154 ranks navigation filters based on user-dependent and/or query-dependent criteria. For example, if the selected content item is requested in response to a user-submitted search query, filter ranking module 154 may use keywords associated with the search query to rank potential navigation filters. The keywords associated with the search query may be the same or similar keywords used to determine relevant search results and/or select a relevant content item in response to the search query. In some implementations, filter ranking module 154 ranks navigation filters based on user profile information independent from a particular user device. For example, if a user device is logged into an online account or profile through a user device, information associated with the account or profile (e.g., demographic information, user interests, user preferences, etc.) may be used to establish navigation filter rankings. A user device may be associated with one or more users, user accounts, and/or user profiles.

Filter ranking module 154 may also consider user-dependent criteria in ranking navigation filters. User-dependent criteria may include profile information associated with the user device to which the selected content item is to be distributed. Profile information may include interest categories or behavioral data associated with the user device (e.g., user demographic information). For example, if a particular user device has only ever clicked on items within the "Style" heading, filter ranking module 154 may rank the "Style" heading above other potential headings. As another example, if a history of search queries or search result selections received from a user device reveals that previous shopping behavior for the user device has been primarily brand-oriented, filter ranking module 154 may rank the "Brand" heading above other potential headings.

Filter ranking module 154 may also rank the conceptually parallel items associated with the navigation filter headings. In some implementations, filter ranking module 154 uses the same or similar criteria to rank items as is used to rank headings (e.g., query-dependent criteria, user-dependent criteria, globally ordered lists, etc.). In some implementations, filter ranking module 154 ranks items within a heading based on the order or appearance of such items on the target resource. For example, items may be ordered in the same order that such items appear on the target resource (e.g., by proximity to the top of the target resource, whether an item is above or below the fold, proximity to the left side or horizontal center of the target resource, etc.), by descending item count within each item (e.g., as indicated by a submenus or lists on the target resource), by number of occurrences of the item on the target resource. In some implementations, filter ranking module 154 ranks items alphabetically, numerically, or according to any other logical criteria.

In some implementations, filter ranking module 154 assigns each navigation filter a score. The score may be based on a weighted average of any of the ranking criteria discussed above, or any other ranking criteria as may be relevant for alternate implementations. The weights assigned to the various ranking criteria may be altered or customized by a customer (e.g., via a management interface). Alternatively, a customer may specify different ranking criteria or submit a globally ordered list ranking potential headings, items, or navigation filters as a whole. Filter ranking module 154 may use the score assigned to each navigation filter to determine which of the navigation filters to include with the selected content item.

In some implementations, filter ranking module 154 discards or removes navigation filters having less than a threshold number of items (e.g., less than two items, less than three items, etc.) associated therewith. In some implementations, filter ranking module 154 determines a number of items associated with each navigation filter that match a normalized archetypal item. Filter ranking module 154 may distinguish between navigation filter items that are identified as matching an archetypal item (e.g., by item matching module 142) and navigation filter items that are identified as having the same path as the path to an archetypal item (e.g., by item generalization module 144). Filter creation module 154 may discard navigation filters that have less than a threshold number of items that are identified as matching an archetypal item (e.g., less than one item, less than two items, less than three items, etc.).

In some implementations, filter ranking module 154 removes from consideration (e.g., deletes, discards, demotes, etc.) navigation filters that are not specific to the content of the target resource. For example, some groups of electronic resources (e.g., websites) may include overarching menus that appear on many individual resources within the group (e.g., multiple webpages within the same domain). Such menus may provide a user with the ability to easily navigate the group of electronic resources, but do not necessarily relate to the content of the target resource. In some implementations, the set of navigation filters generated for the target resource may include one or more navigation filters based on an overarching menu.

Filter ranking module 154 may identify navigation filters that are not specific to the content of the target resource by determining a number of repeat instances of each navigation filter in a set of navigation filters for a grouping of electronic resources that includes the target resource (e.g., navigation filters for multiple webpages of a website). If the number of repeat instances of a particular navigation filter in the grouping exceeds a threshold value, filter ranking module 154 may discard the navigation filter.

In some implementations, filter ranking module 154 determines a number of repeat instances of each navigation filter by generating and comparing a fingerprint for each navigation filter. The fingerprint for a navigation filter may be based on a combination of the paths (e.g., XPaths, an XPath variant, etc.) associated with various elements of the navigation filter. For example, filter ranking module 154 may generate a fingerprint for a navigation filter based on the path to the navigation filter heading and/or the path to the navigation filter items (e.g., a combination or function of the path to the heading and the path to the items). In some implementations, all of the navigation filter items share the same path such that the path to any single item in the navigation filter can be selected to represent the paths to all of the items in the navigation filter. In some implementations, filter ranking module 154 generates a fingerprint for each navigation filter based on the text of the navigation filter heading and/or the text of one or more of the navigation filter items. The text may be the normalized text string displayed in the navigation filter or the original (e.g., pre-normalized) text extracted from the target resource.

Filter ranking module 154 may compare the fingerprints for the generated navigation filters to determine a number of repeat instances of each navigation filter. If the number of repeat instances of a navigation filter exceeds a threshold value, filter ranking module 154 may remove the repeated navigation filter from consideration as a potential navigation filter for integration with the content item. In various implementations, the threshold value may be specified as a static threshold (e.g., two repeat instances, three repeat instances, etc.), as a percentage or proportion of the total number of navigation filters in the group (e.g., 5%, 10%, 20%, etc.), or as a variable determined by another function or process.

In some implementations, the frequency with which each fingerprint (or XPath-like query used to generate the fingerprint) appears may be used to discover additional potential navigation filter headings and potential navigation filter items. For example, the most common fingerprints and/or XPath-like queries in a given grouping (e.g., a domain) may be identified. The annotations specified by the identified fingerprints and/or XPath-like queries may be traversed to identify more potential navigation filter headings and items.

Still referring to FIG. 2, memory 134 is shown to include a filter integration module 156. Filter integration module 156 may receive a set of ranked navigation filters from filter ranking module 154 or from a separate data source (e.g., from content providers 106). Filter integration module 156 may also receive the content item selected by content selection module 136. Filter integration module 156 may combine (e.g., attach, append, embed, integrate, include, etc.) one or more of the navigation filters with the selected content item to create a modified content item.

In some implementations, filter integration module 156 selects one or more of the top ranking (e.g., highest scoring, highest priority, etc.) navigation filters (e.g., as determined by filter ranking module 154) for integration with the selected content item. Filter integration module 156 may select the one or more highest ranking navigation filters according to several potential selection strategies. In some implementations, the selection of navigation filters is based on the number of headings and/or items which can fit in a predetermined display space within the content item.

In some implementations, the display size of the predetermined display space may be fixed (e.g., a fixed height and width). For example, the display height of the predetermined display space may have a standard or uniform height of approximately 15 pixels. In other implementations, the display size of the predetermined display space may be partially fixed (e.g., a fixed height and a variable width), or completely variable (e.g., a variable height and a variable width). The display size of the predetermined display space may be based on the display size (e.g., display height, display width, etc.) of the selected content item, the display size of the browser window and/or content slot in which the content item will be presented, the display resolution or screen size of the user device to which the content item will be distributed, or any other criteria affecting an amount of space available for rendering and presenting navigation filters.

In some implementations, filter integration module 156 selects the highest scoring navigation filter and the maximum number of items within the navigation filter which can fit in the predetermined display space. The maximum number of items which can fit in the predetermined display space may depend on the string length (e.g., number of characters) of the navigation filter heading and items within the heading. A second navigation filter can be added if space remains after adding the first navigation filter. As another example, filter integration module 156 may select the two highest scoring navigation filters including the top two scoring items within each of the two highest scoring navigation filters. Filter integration module 156 may select additional items for each of the selected navigation filters (e.g., alternating, evenly, etc.) if space remains after selecting the top two scoring items.

In some implementations, filter integration module 156 truncates headings and/or items to a limited number of characters to conserve display space within the content item. Truncated headings and items may be represented using ellipsis or other marker to indicate that the text was trimmed. Filter integration module 156 may also use an ellipsis or other marker to indicate that not all items for a navigation filter are displayed. For example, if a navigation filter has five items and only two items are displayed, filter integration module 156 may use an ellipsis to indicate that not all variation within the heading is represented in the displayed items. In some implementations, filter integration module 156 selects only navigation filters having at least two visible items (e.g., based on the number of items which would fit into the predetermined display space if the filter were selected). In some implementations, filter integration module 156 selects no more than a threshold number (e.g., one, two, five, etc.) of navigation filters per content item.

Filter integration module 156 may convert the selected navigation filters into HTML extensions for integration with the selected content item. The selected content item and the integrated navigation filters form a modified content item. The modified content item may include display data which causes a user device to render the navigation filters visually when the modified content item is presented via the user device. Filter integration module 156 may cause the navigation filters to be rendered in a variety of different formats, described in greater detail with reference to FIGS. 3-5.

Figure 3:
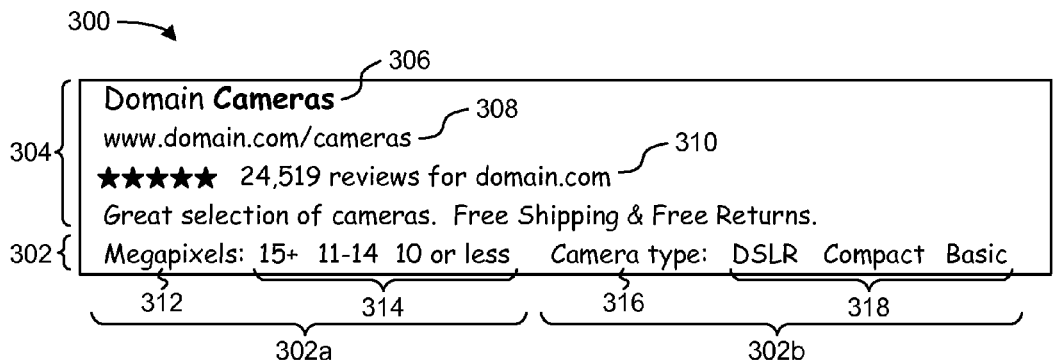
FIG. 3 is a drawing of a content item which has been modified by the content server of FIG. 2 to include a set of informational navigation filters, according to a described implementation.
Figure 4:
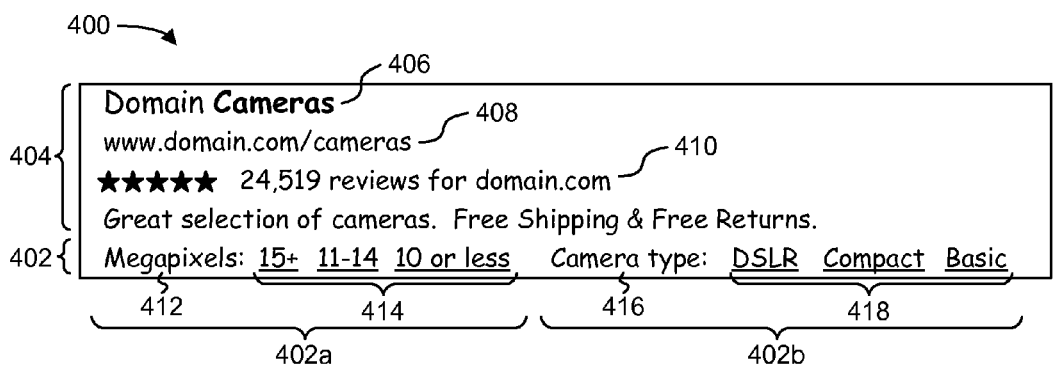
FIG. 4 is a drawing of a content item which has been modified by the content server of FIG. 2 to include a set of linked navigation filters, according to a described implementation.
Figure 5:
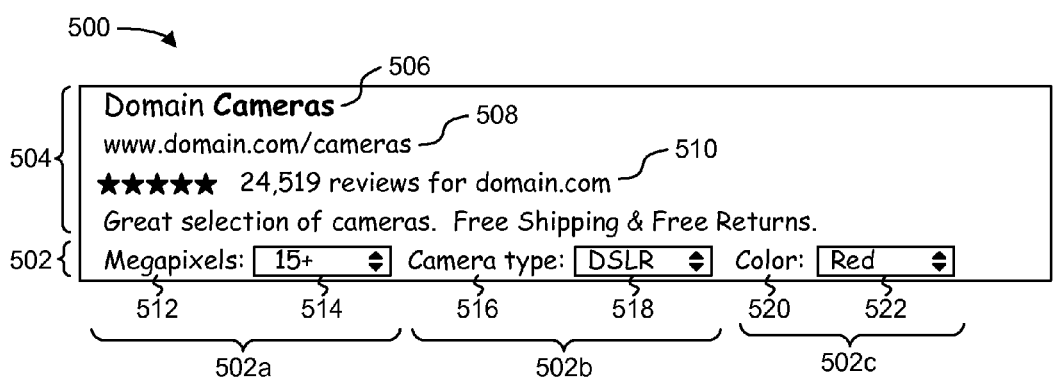
FIG. 5 is a drawing of a content item which has been modified by the content server of FIG. 2 to include a set of dropdown navigation filters, according to a described implementation.

Referring now to FIGS. 3-5, several modified content items 300, 400, and 500 are shown, according to a described implementation. Modified content items 300, 400, and 500 illustrate several potential formats with which the navigation filters can be rendered. The illustrated navigation filters are shown to include informational navigation filters 302 (shown in FIG. 3), linked navigation filters 402 (shown in FIG. 4), and dropdown navigation filters 502 (shown in FIG. 5). Although modified content items 300, 400, and 500 are shown as textual content items, the navigation filters can be integrated with any type of content (e.g., display content, image content, animated content, etc.). Content items 300, 400, 500 may be displayed in content slots of an electronic resource (e.g., resources 104) or a search results page (e.g., as "sponsored search results"). For example, content items 300, 400, and 500 are shown as generalized content which may be displayed in response to a search query for the term "cameras."

Referring specifically to FIG. 3, a modified content item 300 having informational navigation filters 302 is shown, according to a described implementation. Content item 300 is shown to include a content portion 304 and navigation filters 302. Content portion 304 may include the content originally present in the unmodified content item selected by content selection module 136. For example, content portion 304 is shown to include a title 306, a target URL 308, and an ad creative 310. Title 306 and ad creative 310 may be provided by content providers 106 or automatically generated by content server 112. Target URL 308 may be a hyperlink URL to which a user device is directed upon clicking content item 300.

Navigation filters 302 are informational navigation filters. Informational navigation filters 302 are shown to include a first informational navigation filter 302a and a second informational navigation filter 302b. First informational navigational filter 302a is shown to include a heading 312 (e.g., "Megapixels") and a plurality of items 314 (e.g., "15+," "11-14," "10 or less"). Items 314 may be conceptually parallel items having variation along a single dimension. In some implementations, the dimension of variation for items 314 may be defined by heading 312. Second informational navigational filter 302b is shown to include a heading 316 (e.g., "Camera type") and a plurality of items 318 (e.g., "DSLR," "Compact," "Basic"). Items 318 may be conceptually parallel items having variation along a single dimension. In some implementations, the dimension of variation for items 318 may be defined by heading 316.

Informational navigation filters 302 may present items 314 and 318 as unlinked lists. Each unlinked list may follow a heading (e.g., headings 312 and 316 respectively). Informational navigation filters 302 may provide information relating to the content of the target resource (e.g., the resource defined by target URL 308) without introducing additional hyperlinks. In some implementations, headings 312, 316 may be separated from items 314, 318 by a predefined separator (e.g., a colon, a comma, a dash, empty space, etc.). Items 314, 318 within each of headings 312, 316 may be separated from each other by one or more predefined separators. For example, items 314 are shown with space inserted between each of items 314.

Referring now to FIG. 4, a modified content item 400 having linked navigation filters 402 is shown, according to a described implementation. Content item 400 is shown to include a content portion 404 and navigation filters 402. Content portion 404 may include the content originally present in the unmodified content item selected by content selection module 136 and may be the same or similar to content portion 302. For example, content portion 404 is shown to include a title 406, a target URL 408, and an ad creative 410.

Navigation filters 402 are linked navigation filters. Linked navigation filters 402 may be similar to unlinked navigation filters 302. For example, linked navigation filters 402 are shown to include a first linked navigation filter 402a and a second linked navigation filter 402b. First linked navigational filter 402a is shown to include a heading 412 and a plurality of items 414. Second linked navigation filter 402b is shown to include a heading 416 and a plurality of items 418.

Linked navigation filters 402 may present items 414 and 418 as linked lists. For example, items 414, 418 may be rendered as embedded hyperlinks within content item 400. Items 414, 418 may be underlined or otherwise marked to indicate the presence of a hyperlink. In some implementations, each of items 414, 418 includes a hyperlink URL (not shown). The hyperlink URLs associated with items 414, 418 may link to a target resource (or specific portion of a target resource) that filters by the item condition. For example, clicking the item "15+" within "Megapixels" heading 412 may cause a user device to navigate to a specific portion of the target resource which includes information relating to cameras having a "Megapixels" attribute of "15+."

In some implementations, a subset of items 414, 418 may be hyperlinked. For example, one or more of items 414, 418 may be presented as informational items similar to items 314, 318 (e.g., without embedded hyperlinks). Items 414, 418 may include entirely hyperlinked items or a mixture of hyperlinked and non-hyperlinked items. The hyperlinks embedded within items 414, 418 may identify a resource within the domain associated with content item 400 (e.g., "www.domain.com") or outside the domain associated with content item 400.

Referring now to FIG. 5, a modified content item 500 having dropdown navigation filters 502 is shown, according to a described implementation. Content item 500 is shown to include a content portion 504 and navigation filters 502. Content portion 504 may include the content originally present in the unmodified content item selected by content selection module 136 and may be the same or similar to content portions 304 and 404. For example, content portion 504 is shown to include a title 506, a target URL 508, and an ad creative 510.

Navigation filters 502 are dropdown navigation filters. Dropdown navigation filters 502 are shown to include a first dropdown navigation filter 502a, a second dropdown navigation filter 502b, and a third dropdown navigation filter 502c. Each of navigation filters 502 may include a heading (e.g., headings 512, 516, and 520) and a plurality of items within each heading (e.g., items 514, 518, and 522 respectively). The headings for drop down navigation filters 502 may be either in the dropdown portion (as shown in FIG. 5) or outside the dropdown (e.g., in a prefix label) such that only the items are included in the dropdown portion. Advantageously, dropdown navigation filters 502 may reduce the horizontal space required to display a plurality of items by presenting such items as dropdown lists. Dropdown navigation filters 502 are shown to include an additional navigation filter 502c (e.g., "color") not included in content items 300 or 400 due to this horizontal space conservation.

Dropdown navigation filters 502 may allow a user to click on a dropdown list to select any of the plurality of items 514, 518, or 522 within the dropdown list. In some implementations, items 514, 518, 522 may be hyperlinked. The hyperlinks associated with items 514, 518, and 522 may link to a target resource (or specific portion of a target resource) that filters by a condition specified by the hyperlinked item. In some implementations, a subset of items 514, 518, 522 may be hyperlinked. Items 514, 518, 522 may include entirely hyperlinked items or a mixture of hyperlinked and non-hyperlinked items.

Figure 6:
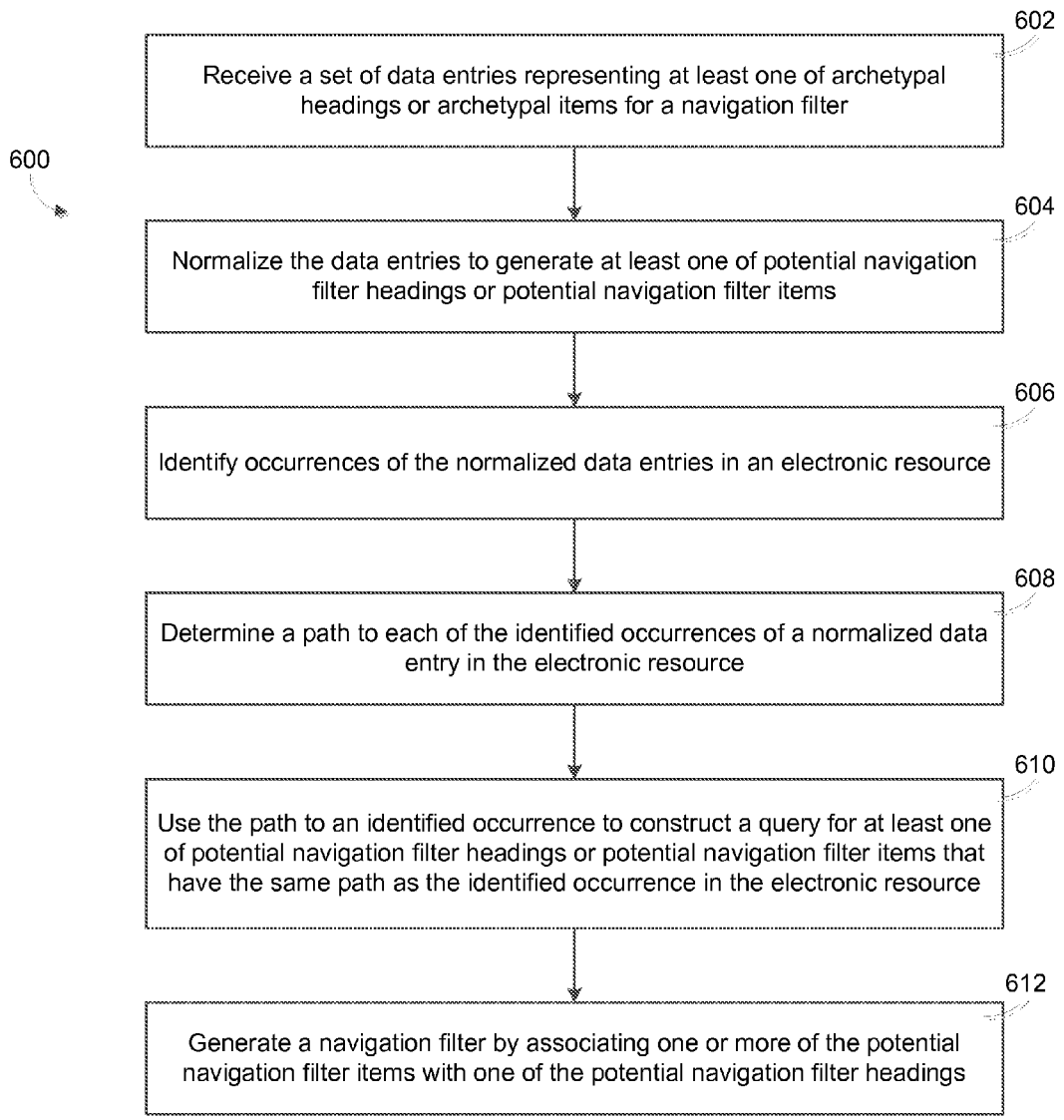
FIG. 6 is a flowchart of a process for generating navigation filters, according to a described implementation.

Referring now to FIG. 6, a flowchart of a process 600 for generating navigation filters is shown, according to a described implementation. Process 600 may be performed by content server 112 using one or more memory modules thereof (e.g., modules 136-156). In some implementations, process 600 is performed by processing circuit 130. Process 600 may be used to parse the content of a target resource for potential navigation filter text (e.g., heading text, item text, etc.), to identify occurrences of archetypal navigation filter text in the target resource, and to identify additional navigation filter content based on the paths to identified occurrences of archetypal text in the target resource.

Still referring to FIG. 6, process 600 is shown to include receiving a set of data entries representing at least one of archetypal headings or archetypal items for a navigation filter (step 602). Archetypal headings and archetypal items may be predetermined examples of textual data representing headings or items that would be suitable for use in a navigation filter (e.g., golden examples, golden text, etc.). A set of archetypal items may include a plurality of conceptually parallel items that vary with respect to a specific heading type. For example, for the heading type "Brands," a set of archetypal items may include various brand names, entity names, trademarks, service marks, or other identifiers that can be used to classify or filter by a brand attribute. For the heading type "Colors," a set of archetypal items may include various colors that can be used to classify or filter by a color attribute. Archetypal headings may represent various attributes (e.g., color, brand, price, geographic location, size, model, style, condition, etc.) that can be used to filter or sort a set of products, services, promotions, locations, or other items displayed on the target resource.

In some implementations, step 602 includes loading or obtaining the archetypal data entries from a key-value lookup table. For example, archetypal headings and/or archetypal items may be stored in the key-value lookup table as a list of text strings. The key-value lookup table may be stored locally (e.g., in memory 134) or remotely (e.g., in data storage devices 110). In some implementations, step 602 includes loading the archetypal data entries from a configuration file or table. The configuration file/table may specify the archetypal data entries explicitly, implicitly, or by reference to another data source. For example, the configuration file/table may specify archetypal headings by the regular expression "(Featured|Top)?(Brands?|Designers?)" which implicitly specifies the archetypal headings "Featured Brands," "Featured Designers," "Top Brands," and "Top Designers." In some implementations, step 602 includes loading the archetypal data entries from a list, table, or other data source. The location of the list, table, or other data source specifying the archetypal data entries may be provided in the configuration file/table.

In some implementations, step 602 includes receiving the set of data entries in a raw textual form. For example, the data entries may include text strings such as "Swimwear International Limited," "Brand A Inc.," "domain.com," or other text strings that represent archetypal headings or archetypal items for use in a navigation filter. Step 602 may include loading the raw textual data into local memory or otherwise obtaining the data entries from a data source.

Still referring to FIG. 6, process 600 is shown to include normalizing the data entries to generate at least one of potential navigation filter headings or potential navigation filter items (step 604). Step 604 may include, for example, removing extraneous punctuation or numbers, trimming whitespace, standardizing casing, adjusting plurality, or otherwise normalizing the data entries to convert the data entries to a standard form. In some implementations, normalization rules may be specified in a configuration file or a configuration table. For example, the configuration file/table may provide one or more normalization routines that can be applied to each of the raw textual data entries.

In some implementations, normalization rules are provided by a regular expression. For example, the regular expression "(?i)^(?:\\PL+)?(?:The|A|An)?(.+?)(?:,||Group|Inc\\.?|Incorporated|Company|Co\\.?|Ltd\\.?|Corp\\.?|Corporation|Limited|International|Brand|\\.com|\\.net|\\.org)*(?:\\PL+)?")" specifies a normalization routine that includes removing the prefixes "The," "A," and "An," and the suffixes "Group," "Inc.," "Incorporated," "Company," "Co.," "Ltd.," "Corp.," "Corporation," "Limited," "International," "Brand," ".com," ".net," and ".org" from each of the raw textual data entries received in step 602. Using this normalization routine, the archetypal item "Domain.com" would be normalized to "Domain" and the archetypal item "Swimwear International Limited" would be normalized to "Swimwear." The regular expression may be obtained from a configuration file, a configuration table, or otherwise provided for use in step 604. The normalized data entries generated in step 604 may be used as potential navigation filter headings and/or potential navigation filter items.

Still referring to FIG. 6, process 600 is shown to include identifying occurrences of the normalized data entries in an electronic resource (step 606). Step 606 may include searching the content of the target resource for text strings that match one or more of the normalized archetypal items or the normalized archetypal headings generated in step 604. For example, if one of the normalized archetypal items is the text string "Brand A," step 606 may include searching the content of the target resource for instances of the text string "Brand A." As another example, if one of the archetypal headings is the text string "Featured Brands," step 606 may include searching the content of the target resource for instances of the text string "Featured Brands." In various implementations, step 606 includes searching for occurrences of the normalized archetypal data entries in the unmodified content of the target resource or in a parsed representation of the target resource (e.g., a representation of the target resource generated by resource parsing module 140).

In some implementations, step 606 includes searching for text strings that match a normalized archetypal item in only the content areas of the target resource that are associated with hyperlinks. For example, step 606 may include parsing the target resource (or a representation thereof) to identify hyperlinks by searching for hyperlink markup tags. In other implementations, step 606 includes receiving a listing or other indication of previously-identified hyperlinks (e.g., from resource parsing module 140). Step 606 may include testing each of the identified hyperlinks (e.g., in HTML position order) to determine whether the content text associated with the hyperlink matches a normalized archetypal item. In other implementations, item step 606 includes searching other content areas of the target resource for text string matches in addition to the content areas associated with hyperlinks.

In some implementations, step 606 includes searching the content of the target resource for tags (e.g., hyperlink tags <a>, heading tags <h1>, <h2>, . . . <h9>, list tags <ul>, <li>, etc.) having content that matches an archetypal heading. Step 606 may include testing each tag of the target resource (e.g., in HTML position order) to determine whether the content text associated with the tag matches an archetypal heading. In some implementations, all tags of the target resource may be searched and/or tested for matching content regardless of whether the tag is an actual HTML heading tag (e.g., <h1>, <h2>, . . . <h9>). For example, in the following HTML code snippet, step 606 may include identifying the content of the tag <h2> as matching the "Featured Brands" archetypal heading.

```
<html>
  <div>
    <h2>Featured Brands</h2>
    <p>
      <a>Brand A</a>
    </p>
    <p>
      <a>Brand B</a>
    </p>
    <h2>Special Offers</h2>
    <p>
      <a>Product A</a>
    </p>
    <p>
      <a>Product B</a>
    </p>
  </div>
```

In some implementations, step 606 includes searching for content that matches an archetypal heading within leaf nodes of the target resource. For example, step 606 may include receiving a DOM representation of the target resource and identifying one or more leaf nodes of the target resource using the DOM representation thereof. Step 606 may include ignoring tags of the target resource that are not leaf nodes while searching for archetypal headings. For example, the search performed in step 606 may ignore the heading tag
    <h2>Featured Brands<ul><li><a>Brand A</a></li> . . . </h2>
because the heading tag <h2> is not a leaf node. In some implementations, the search performed in step 606 excludes children of links while searching for archetypal headings. The search may exclude, omit, or remove a tag from consideration as a potential navigation filter heading in response to a determination that the tag is not a leaf node and/or in response to a determination that the tag is a child node of a hyperlink element. In other implementations, step 606 includes searching for archetypal headings in all tags of the target resource regardless of whether the tag is a leaf node and/or a child node of a hyperlink.

In some implementations, step 606 includes marking a hyperlink or other tag of the target resource with a navigation filter item annotation in response to a determination that the content text associated with the hyperlink or other tag matches one or more of the normalized archetypal items. The navigation filter item annotation may indicate that the annotated tag of the target resource includes a text string that can be used as a potential navigation filter item. Step 606 may include storing each identified occurrence of a normalized archetypal item as a potential navigation filter item. For example, if step 606 identifies the hyperlink
    <a href="/some_path_A.html">Brand A</a>
as a content element of the target resource that includes a text string (e.g., "Brand A") matching a normalized archetypal item, the link text "Brand A" may be extracted and/or stored as a text string that can be used as a potential navigation filter item.

In some implementations, step 606 includes marking a tag of the target resource with a navigation filter heading annotation in response to a determination that the content text associated with the tag matches one or more of the archetypal headings. The navigation filter heading annotation may indicate that the annotated tag of the target resource includes a text string that represents a potential navigation filter heading.

In some embodiments, occurrences of archetypal headings in the target resource may be normalized prior to use as a potential navigation filter heading. For example, the configuration table used in step 606 to identify occurrences of archetypal headings may specify that any heading matching the regular expression "(Featured|Top)?(Brands?|Designers?)" will be normalized to the potential navigation filter heading "Brands."

Still referring to FIG. 6, process 600 is shown to include determining a path to each of the identified occurrences of a normalized data entry in the electronic resource (step 608). The path may be an XPath, a variant of the XPath, a URL path, or other path indicating a particular location within the content of the target resource (e.g., identifying a particular tag, a particular section, etc.). In some implementations, step 608 includes selecting a path to each identified occurrence from a plurality of potential paths that lead to the same element of the target resource.

In some implementations, step 608 includes selecting the path from the root HTML tag to the identified occurrence of the normalized archetypal data entry. Step 608 may include identifying a root element of the target resource and determining a path from the root element to the identified occurrence of the normalized archetypal item. For example, step 608 may include determining that the path from the root element <html> to the first hyperlink element <a> in the following HTML code snippet is "/div/ul/li/a."

```
<html>
  <div>
    <ul>
      <li>
        <a href="/some_path_A.html">Brand A</a>
      </li>
      <li>
        <a href="/some_path_B.html">Brand B</a>
      </li>
    </ul>
  </div>
```

Step 608 may include storing the path from the root element to the normalized archetypal data entry for use in step 610.

Still referring to FIG. 6, process 600 is shown to include using the path to an identified occurrence to construct a query for at least one of potential navigation filter headings or potential navigation filter items that have the same path as the identified occurrence in the electronic resource (step 610). In some implementations, step 610 includes searching the content of the target resource for elements that have the same path as the path to an identified occurrence of a normalized archetypal data entry. For example, step 610 may include constructing a query for additional headings that can be used as potential navigation filter headings and/or additional items that can be used as potential navigation filter items. In some implementations, step 610 includes searching the content of the target resource for elements that have the same path as the path to an identified occurrence of an archetypal heading and/or item.

Step 610 may include searching for additional potential navigation filter items in hyperlinks or other tags of the target resource that have the same path as the path to an identified occurrence of a normalized archetypal item. For example, in the HTML code snippet provided above, the second hyperlink element (i.e., <a href="/some_path_B.html">Brand B</a>) and the first hyperlink element (i.e., <a href="/some_path_A.html">Brand A</a>) have the same path from the <html> root element (i.e., "/div/ul/li/a").

In some implementations, step 610 includes searching for additional potential navigation filter items in only the content areas of the target resource that are associated with hyperlinks. For example, step 610 may include identifying one or more hyperlinks that have the same path as the path to an identified occurrence of a normalized archetypal item. In other implementations, step 610 includes searching other content areas of the target resource in addition to the content areas associated with hyperlinks.

Step 610 may include searching for additional potential navigation filter headings in tags or other elements of the target resource that have the same path as the path to an identified occurrence of an archetypal heading. In some implementations, the search performed in step 610 assumes that all navigation filter headings are leaf nodes and not child nodes of hyperlinks. Step 610 may include searching for additional potential navigation filter headings in only the content areas of the target resource that are associated leaf nodes that are not child nodes of hyperlinks. In other implementations, step 610 includes searching other content areas of the target resource in addition to the content areas associated with leaf nodes that are not children of hyperlinks.

In some implementations, the search performed in step 610 assumes that navigation filter headings and navigation filter items share a common immediate parent. For example, in the HTML code snippet provided above, the heading "Featured Brands" and the items "Brand A" and "Brand B" share the common immediate parent "<div>." In some implementations, step 610 includes identifying archetypal headings that share a common immediate parent with a threshold number of archetypal items (e.g., two or more, three or more, etc.). Step 610 may include marking or identifying such headings as a high-confidence heading. In some implementations, step 610 includes searching for additional potential navigation filter headings in only the content areas of the target resource that have the same path as high-confidence headings.

In some implementations, step 610 includes marking a hyperlink or other tag of the target resource with a navigation filter item annotation in response to a determination that the content text associated with the hyperlink or other tag has the same path as a normalized archetypal item. The navigation filter item annotation may indicate that the annotated tag of the target resource includes a text string that can be used as a potential navigation filter item. Step 610 may include marking a tag or other element of the target resource with a navigation filter heading annotation in response to a determination that the content text associated with the tag or other element has the same path as an archetypal heading. The navigation filter heading annotation may indicate that the annotated tag of the target resource includes a text string that can be used as a potential navigation filter heading.

Step 610 may include storing a textual portion of each identified tag that matches a normalized archetypal item (e.g., link text, a name attribute, a title attribute, etc.) as a potential navigation filter item. For example, if the search performed in step 610 identifies the hyperlink <a href="/some_path_B.html">Brand B</a> as a content element of the target resource that has the same path as the path to an identified occurrence of a normalized archetypal item, the link text "Brand B" may be extracted and/or stored as a text string that can be used as a potential navigation filter item.

Step 610 may include storing a textual portion of each identified tag or other element that matches an archetypal heading (e.g., heading text, link text, a name attribute, a title attribute, etc.) as a potential navigation filter heading. For example, if the search performed in step 610 identifies the heading <h2>Special Offers</h2> as a content element of the target resource that has the same path as the path to an identified occurrence of an archetypal heading (e.g., "/div/h2"), the heading text "Special Offers" may be extracted and/or stored as a text string that can be used as a potential navigation filter heading.

Still referring to FIG. 6, process 600 is shown to include generating a navigation filter by associating one or more of the potential navigation filter items with one of the potential navigation filter headings (step 612). Step 612 may include searching for tags or other elements of the target resource that have been marked with a navigation filter item annotation or a navigation filter heading annotation in step 610. Step 612 may include determining a text string associated with each annotation. In various implementations, the text string may be literal text extracted from the annotated element of the target resource (e.g., link text, heading text, alt text, etc.), normalized text generated by normalization module 150 (e.g., normalized versions of the text extracted from the target resource), renamed text (e.g., a renamed heading based on a renaming rule provided in a configuration table), or other text that can be used as a navigation filter heading and/or a navigation filter item.

Step 612 may include determining a sequence in which the potential navigation filter headings and potential navigation filter items appear in the target resource. In some implementations, step 612 includes arranging the text strings associated with each annotation in a sequence defined by the HTML position of the corresponding annotations. Step 612 may include identifying each element of the sequence as a potential navigation filter heading or a potential navigation filter item. For example, steps 610-612 may generate the sequence H:Brands, I:Brand A, I:Brand B, H:Colors, I:Blue, I:Red, I:Green where the identifier "H" marks the element as a potential navigation filter heading and the identifier "I" marks the element as a potential navigation filter item.

Step 612 may include generating navigation filters by associating each potential navigation filter heading with one or more potential navigation filter items. In some implementations, step 612 includes associating each potential navigation filter item with the potential navigation filter heading immediately preceding the potential navigation filter item in the sequence. In other words, step 612 may associate each potential navigation filter heading with one or more potential navigation filter items that occur after the potential navigation filter heading in the sequence but before the next potential navigation filter heading in the sequence. For example, for the sequence provided above, step 612 may include creating a first navigation filter with the heading "Brands" and items "Brand A" and "Brand B" and a second navigation filter with the heading "Colors" and the items "Blue," "Red," and "Green."

In some implementations, step 612 includes using additional heuristics to associate potential navigation filter items with a potential navigation filter heading. For example, step 612 may include determining or assuming that the first potential navigation filter item ($I_1$) immediately following a first potential navigation filter heading ($H_1$) is most likely to be truly associated with the first potential navigation filter heading $H_1$. Accordingly, step 612 may associate item $I_1$ with heading $H_1$. Step 612 may include determining the path ($X_1$) to item $I_1$ (e.g., the unique path from the root HTML element to item $I_1$) and the most recent common ancestor ($MRCA_1$) of both heading $H_1$ and item $I_1$ (e.g., the most recent common ancestor in a document object model representation of the target resource). For each additional potential navigation filter item ($I_2 \ldots I_n$) between heading $H_1$ and the next potential navigation filter heading ($H_2$), step 612 may include determining the paths ($X_2 \ldots X_n$) to each respective item $I_2 \ldots I_n$ and the most recent common ancestor ($MRCA_2 \ldots MRCA_n$) of each respective item $I_2 \ldots I_n$ with heading $H_1$. In some implementations, step 612 associates an item (e.g., one of items $I_2 \ldots I_n$) with heading $H_1$ only if the path to the item (e.g., one of paths $X_2 \ldots X_n$) is the same as path $X_1$. In some implementations, step 612 associates an item (e.g., one of items $I_2 \ldots I_n$) with heading $H_1$ only if the most recent common ancestor of the item and $H_1$ (e.g., one of $MRCA_2 \ldots MRCA_n$) is the same as $MRCA_1$.

In some implementations, step 612 includes creating navigation filters having a single heading and a plurality of conceptually parallel items within the heading. In some implementations, the conceptually parallel items may have variation along a single dimension. The dimension of variation may be defined by the heading of the navigation filter. For example, in response to a search query for "desktop hard drives," content selection module 136 may select a content item associated with an online retailer of computer hardware. Step 612 may include identifying the heading "Capacity" among the headings extracted from the retailer's landing page and generating a list of conceptually parallel items which vary along the "Capacity" dimension (e.g., 500 GB, 1 TB, 2+TB, etc.). As another example, for the heading "Brands," step 612 may generate a list of conceptually parallel items which vary along the "Brands" dimension (e.g., Brand A, Brand B, Brand C, etc.).

By ensuring that a navigation filter includes only conceptually parallel items, process 600 can generate navigation filters which follow the hierarchical structure of the target resource and/or which summarize the content of the target resource in a way that is easy for users to understand. This capability provides a distinct advantage over alternative approaches which group conceptually unrelated items. For example, if a user device submits a search query for "flowers," extracting and presenting items from a target resource without assuring that the items vary along only a single dimension could produce a list such as "Roses," "30% off," and "Free Shipping." These items are not conceptually parallel and do not adequately summarize the various types of flowers the target resource has to offer.

Figure 7:
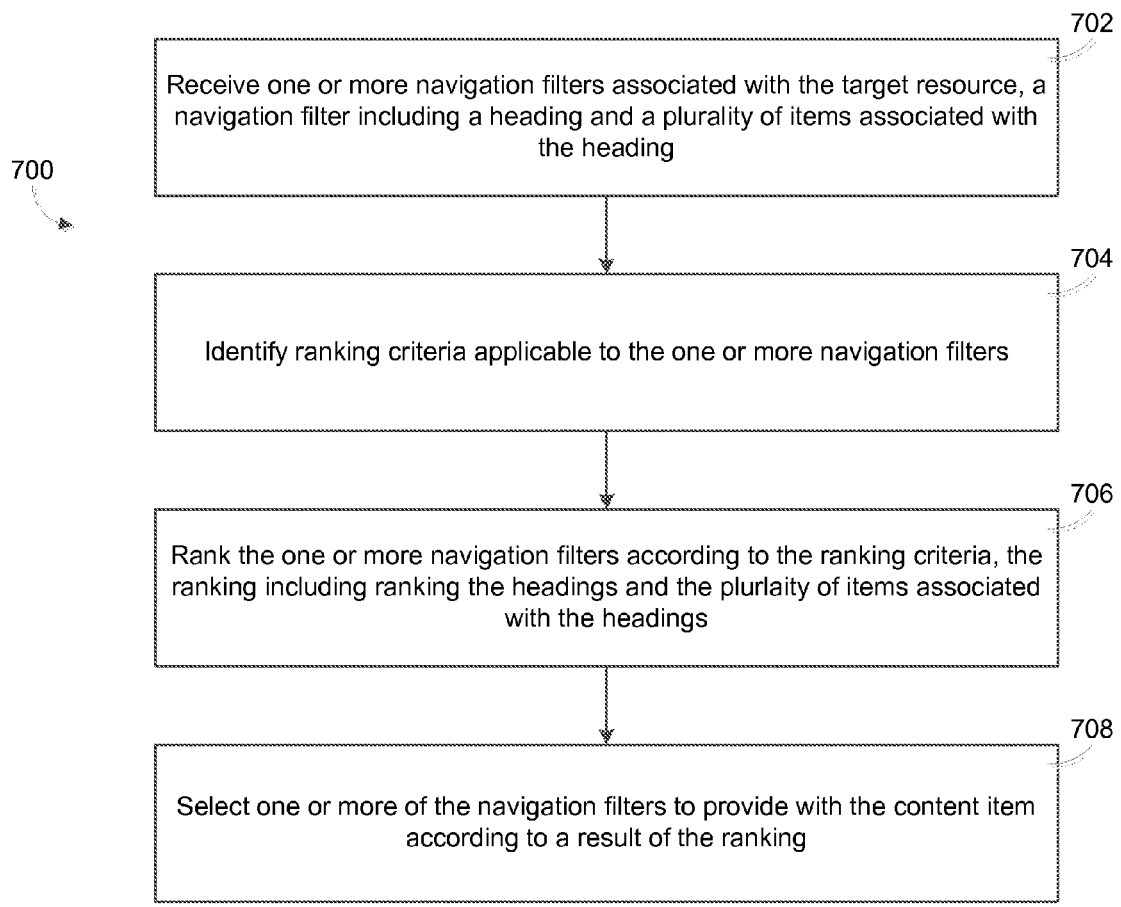
FIG. 7 is a flowchart of a process for ranking and selecting navigation filters for integration with a content item distributed via a computer network, according to a described implementation.

Referring now to FIG. 7, a flowchart of a process 700 for ranking and selecting navigation filters to provide with a content item distributed via a computer network is shown, according to a described implementation. Process 700 may be performed by one or more servers (e.g., content server 112, a separate filter ranking server, etc.) using one or more of the memory modules 136-156 described with reference to FIG. 2.

Process 700 is shown to include receiving one or more navigation filters associated with a target resource (step 702). A navigation filter may include a heading and a plurality of items associated with the heading. In some implementations, the plurality of items are conceptually parallel items having variation along a single dimension. The dimension of variation may be defined by the heading of the navigation filter.

In some implementations, the navigation filters are extracted from the target resource. In other implementations, the navigation filters may be imported via a management interface. For example, the navigation filters may be provided by content providers 106 rather than generated from data extracted from the target resource. In some implementations, headings and items comprising the navigation filters may be normalized. The normalization may be performed by content server 112 (e.g., normalization module 150) or the navigation filters may be received in a pre-normalized form (e.g., from content providers 106).

Still referring to FIG. 7, process 700 is shown to include identifying ranking criteria applicable to the one or more navigation filters (step 704). In some implementations, the ranking criteria are query-dependent. For example, if the selected content item is requested in response to a user-submitted search query, the ranking criteria may include keywords associated with the search query. The keywords associated with the search query may be the same or similar keywords used to determine relevant search results and/or select a relevant content item in response to the search query.

In some implementations, the ranking criteria are user-dependent. User-dependent criteria may include profile information associated with the user device to which the selected content item is to be distributed. Profile information may include interest categories or behavioral data associated with the user device. For example, if a particular user device has only ever clicked on items within the "Style" heading, the ranking criteria may indicate that the "Style" heading should be ranked above other potential headings. As another example, if a history of search queries or search result selections received from a user device reveals that previous shopping behavior for the user device has been primarily brand-oriented, the ranking criteria may indicate that the "Brand" heading should be ranked above other potential headings.

In some implementations, the ranking criteria are based on one or more globally ordered lists. The headings and items may be ranked according to the order that the headings and items appear on the globally ordered list. In some implementations, multiple lists may be used. The multiple lists may correspond to different interest categories (e.g., vertical categories, topics of interest, etc.) and may rank potential headings/items differently. Step 704 may include selecting a list based on the keywords submitted as part of a search query and/or the type or category of the selected content item. For example, a user may find different information useful for camera purchases than for booking a cruise. Some or all of the indicators used to select a relevant content item (e.g., interest categories, search keywords, user information, etc.) may be used in selecting a list to rank the navigation filter headings. Headings in the lists may be organized by normalized types (e.g., enum types, categories, etc.) to maintain the manageability of the ordered lists Still referring to FIG. 7, process 700 is shown to include ranking the one or more navigation filters according to the ranking criteria (step 706). Step 706 may include ranking the headings and the plurality of items associated with the headings. The headings may be ranked according to globally ordered lists, user-dependent ranking criteria, and/or query-dependent ranking criteria as provided above. In some implementations, the plurality of items may be ranked using the same or similar ranking criteria used to rank the headings.

In some implementations, step 706 includes ranking items within a heading based on the order or appearance of such items on the target resource. For example, item ranks may be ordered (e.g., from top ranked to bottom ranked) in the same order that such items appear on the target resource (e.g., by proximity to the top of the target resource, whether an item is above or below the fold, proximity to the left side or horizontal center of the target resource, etc.), by descending item count within each item (e.g., as indicated by a submenus or lists on the target resource), or by number of occurrences of the item on the target resource. In other implementations, items may be ranked alphabetically, numerically, or according to any other logical criteria.

In some implementations, step 706 includes assigning each navigation filter a score. The score may be based on a weighted average of any of the ranking criteria discussed above, or any other ranking criteria as may be relevant for alternate implementations. The weights assigned to the various ranking criteria may be altered or customized by a customer (e.g., via a management interface). Alternatively, a customer may specify different ranking criteria or submit a globally ordered list ranking potential headings, items, or navigation filters as a whole.

Still referring to FIG. 7, process 700 is shown to include selecting one or more of the navigation filters according to a result of the ranking (step 708). In some implementations, the selection of navigation filters is based on the number of headings and/or items which can fit in a predetermined display space within the content item. Step 708 may include determining an amount of display space within the content item for displaying the navigation filters.

In some implementations, the display size of the display space may be fixed (e.g., a fixed height and width). For example, the display height of the predetermined display space may have a standard or uniform height of approximately 15 pixels. In other implementations, the display size of the display space may be partially fixed (e.g., a fixed height and a variable width), or completely variable (e.g., a variable height and a variable width). The display size of the display space may be based on the display size (e.g., display height, display width, etc.) of the selected content item, the display size of the browser window and/or content slot in which the content item will be presented, the display resolution or screen size of the user device to which the content item will be distributed, or any other criteria affecting an amount of space available for rendering and presenting navigation filters.

In some implementations, step 708 includes selecting the top ranking (e.g., highest scoring) heading and a maximum number of items associated with the top ranking heading. The maximum number of items may be defined by the maximum number of items which can fit in the display space. The maximum number of items may depend on the string length (e.g., number of characters) of the navigation filter heading and items within the heading as well as the display size of the display space.

In some implementations, step 708 includes selecting a plurality top ranking headings and a pair of items associated with each of the top ranking headings. Step 708 may include adding additional items to each of the selected pairs of items until the available space for displaying the navigation filters is filled. In some implementations, items may be added to each navigation filter evenly (e.g., alternating between navigation filters, sequentially for each of the selected navigation filters, etc.) until the space for displaying the selected navigation filters is filled.

In some implementations, step 708 includes selecting only navigation filters having at least two visible items (e.g., based on the number of items which would fit into the predetermined display space if the filter were selected). In some implementations, step 708 involves selecting no more than a threshold number (e.g., one, two, five, etc.) of navigation filters per content item.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially-generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application-specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD-ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front-end component (e.g., a client computer) having a graphical user interface or a web browser through which a user may interact with an implementation of the subject matter described in this disclosure, or any combination of one or more such back-end, middleware, or front-end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products embodied on one or more tangible media.

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for generating navigation filters, the method comprising:
   receiving, at a processing circuit, a set of data entries comprising raw textual data, the data entries representing at least one of archetypal headings or archetypal items for a navigation filter;
   normalizing the data entries to convert the raw textual data into a standard form, the normalized data entries comprising at least one of potential navigation filter headings or potential navigation filter items;
   identifying occurrences of the normalized data entries in an electronic resource;
   determining a path to each of the identified occurrences of a normalized data entry in the electronic resource, wherein determining the path comprises:
      selecting a root element of the electronic resource; and
      for each identified occurrence of a normalized data entry in the electronic resource,
         identifying one or more intermediate tags of the electronic resource between the root element and the normalized data entry; and
         determining a path from the root element to the normalized data entry through the one or more intermediate tags;
   using the path to an identified occurrence to construct a query for at least one of potential navigation filter headings or potential navigation filter items that have the same path as the identified occurrence in the electronic resource; and
   generating a navigation filter by associating one or more of the potential navigation filter items with one of the potential navigation filter headings.

2. The method of claim 1, wherein the set of data entries comprises a plurality of conceptually parallel items associated with a specific heading type, wherein the set of data entries vary along a dimension defined by the heading type.

3. The method of claim 1, wherein normalizing the data entries comprises at least one of removing extraneous punctuation or numbers, trimming whitespace, standardizing casing, or adjusting plurality.

4. The method of claim 1, wherein identifying occurrences of the normalized data entries in the electronic resource comprises:
   identifying one or more hyperlinks in the electronic resource;
   parsing content text associated with each of the identified hyperlinks to determine whether the content text matches a normalized data entry; and
   marking an identified hyperlink of the electronic resource with a navigation filter item annotation in response to a determination that the content text associated with the identified hyperlink matches one or more of the normalized data entries.

5. The method of claim 1, wherein identifying occurrences of the normalized data entries in the electronic resource comprises:
    identifying one or more tags in the electronic resource;
    parsing content text associated with each of the identified tags to determine whether the content text matches a normalized data entry; and
    marking an identified tag of the electronic resource with a navigation filter heading annotation in response to a determination that the content text associated with the identified tag matches one or more of the normalized data entries.

6. The method of claim 5, further comprising, for each of the identified tags:
    determining whether the tag is a leaf node of the electronic resource; and
    removing the tag from consideration as a potential navigation filter heading in response to a determination that the tag is not a leaf.

7. The method of claim 5, further comprising, for each of the identified tags:
    determining whether the tag is a child node of a hyperlink; and
    removing the tag from consideration as a potential navigation filter heading in response to a determination that the tag is a child node of a hyperlink.

8. The method of claim 1, wherein associating one or more of the potential navigation filter items with one of the potential navigation filter headings comprises:
    determining a sequence in which the potential navigation filter headings and the potential navigation filter items are arranged in the electronic resource;
    identifying one or more of the potential navigation filter items that are arranged between a first heading and a second heading in the sequence; and
    associating with the first heading one or more of the potential navigation filter items that are arranged between the first heading and the second heading.

9. The method of claim 1, wherein associating one or more of the potential navigation filter items with one of the potential navigation filter headings comprises:
    determining a path to a first potential navigation filter item immediately following a potential navigation filter heading in the electronic resource; and
    associating a second potential navigation filter item with the potential navigation filter heading in response to a determination that the second potential navigation filter item has the same path as a first potential navigation filter item.

10. The method of claim 1, wherein associating one or more of the potential navigation filter items with one of the potential navigation filter headings comprises:
    using a document object model representation of the electronic resource to determine a most recent common ancestor of a potential navigation filter heading and a first potential navigation filter item immediately following the potential navigation filter heading; and
    associating a second potential navigation filter item with the potential navigation filter heading in response to a determination that the second potential navigation filter item and the potential navigation filter heading have the same most recent common ancestor as the first potential navigation filter item and the potential navigation filter heading.

11. The method of claim 1, further comprising:
    determining, for each item of the generated navigation filter, whether the item matches one or more of the normalized data entries; and
    discarding the generated navigation filter in response to a determination that the generated navigation filter includes less than a threshold number of items that match one or more of the normalized data entries.

12. The method of claim 1, further comprising:
    generating a set of multiple navigation filters for a grouping of electronic resources;
    determining, for each of the multiple navigation filters, a number of repeat instances of the navigation filter in the set of multiple navigation filters; and
    discarding a generated navigation filter in response to a determination that the number of repeat instances of the generated navigation filter exceeds a threshold value.

13. The method of claim 1, further comprising:
    identifying a defined heading type for the set of data entries;
    determining a dominant interpretation for each of the archetypal items; and
    filtering the set of data entries to remove an archetypal item in response to a determination that the dominant interpretation of the archetypal item does not match the defined heading type.

14. A system for generating navigation filters, the system comprising:
    a processing system configured to:
        receive a set of data entries comprising raw textual data, the data entries representing at least one of archetypal headings or archetypal items for a navigation filter;
        normalize the data entries to convert the raw textual data into a standard form, the normalized data entries comprising at least one of potential navigation filter headings or potential navigation filter items;
        identify occurrences of the normalized data entries in an electronic resource;
        determine a path to each of the identified occurrences of a normalized data entry in the electronic resource, to determine the path, the processing system further configured to:
            select a root element of the electronic resource; and
            for each identified occurrence of a normalized data entry in the electronic resource,
                identify one or more intermediate tags of the electronic resource between the root element and the normalized data entry; and
                determine a path from the root element to the normalized data entry through the one or more intermediate tags;
        use the path to an identified occurrence to construct a query for at least one of potential navigation filter headings or potential navigation filter items that have the same path as the identified occurrence in the electronic resource; and
        generate a navigation filter by associating one or more of the potential navigation filter items with one of the potential navigation filter headings.

15. The system of claim 14, wherein normalizing the data entries comprises at least one of removing extraneous punctuation or numbers, trimming whitespace, standardizing casing, or adjusting plurality.

16. The system of claim 14, wherein the processing system is further configured to:
- identify one or more hyperlinks in the electronic resource;
- parse content text associated with each of the identified hyperlinks to determine whether the content text matches a normalized data entry; and
- mark an identified hyperlink of the electronic resource with a navigation filter item annotation in response to a determination that the content text associated with the identified hyperlink matches one or more of the normalized data entries.

17. The system of claim 14, wherein the processing system is further configured to:
- identify one or more tags in the electronic resource;
- parse content text associated with each of the identified tags to determine whether the content text matches a normalized data entry; and
- mark an identified tag of the electronic resource with a navigation filter heading annotation in response to a determination that the content text associated with the identified tag matches one or more of the normalized data entries.

18. The system of claim 17, wherein the processing system is configured to, for each of the identified tags:
- determine whether the tag is a leaf node of the electronic resource; and
- remove the tag from consideration as a potential navigation filter heading in response to a determination that the tag is not a leaf node.

19. The system of claim 17, wherein the processing system is configured to, for each of the identified tags:
- determine whether the tag is a child node of a hyperlink; and
- remove the tag from consideration as a potential navigation filter heading in response to a determination that the tag is a child node of a hyperlink.

20. The system of claim 14, wherein the processing system is further configured to:
- determine a sequence in which the potential navigation filter headings and the potential navigation filter items are arranged in the electronic resource;
- identify one or more of the potential navigation filter items that are arranged between a first heading and a second heading in the sequence; and
- associate with the first heading one or more of the potential navigation filter items that are arranged between the first heading and the second heading.

21. The system of claim 14, wherein the processing system is further configured to:
- determine a path to a first potential navigation filter item immediately following a potential navigation filter heading in the electronic resource; and
- associate a second potential navigation filter item with the potential navigation filter heading in response to a determination that the second potential navigation filter item has the same path as a first potential navigation filter item.

22. The system of claim 14, wherein the processing system is further configured to:
- use a document object model representation of the electronic resource to determine a most recent common ancestor of a potential navigation filter heading and a first potential navigation filter item immediately following the potential navigation filter heading; and
- associate a second potential navigation filter item with the potential navigation filter heading in response to a determination that the second potential navigation filter item and the potential navigation filter heading have the same most recent common ancestor as the first potential navigation filter item and the potential navigation filter heading.

23. The system of claim 14, wherein the processing system is configured to:
- determine, for each item of the generated navigation filter, whether the item matches one or more of the normalized data entries; and
- discard the generated navigation filter in response to a determination that the generated navigation filter includes less than a threshold number of items that match one or more of the normalized data entries.

24. The system of claim 14, wherein the processing system is configured to:
- generate a set of multiple navigation filters for a grouping of electronic resources;
- determine, for each of the multiple navigation filters, a number of repeat instances of the navigation filter in the set of multiple navigation filters; and
- discard a generated navigation filter in response to a determination that the number of repeat instances of the generated navigation filter exceeds a threshold value.

25. The system of claim 14, wherein the processing system is configured to:
- identify a defined heading type for the set of data entries;
- determine a dominant interpretation for each of the archetypal items; and
- filter the set of data entries to remove an archetypal item in response to a determination that the dominant interpretation of the archetypal item does not match the defined heading type.

26. The system of claim 14, wherein the processing system is configured to:
- identify occurrences of textual data entries in the electronic resource.

* * * * *